United States Patent [19]

Melvin

[11] 3,727,134

[45] Apr. 10, 1973

[54] AUTO EQUALIZER APPARATUS

[75] Inventor: William J. Melvin, Costa Mesa, Calif.

[73] Assignee: Collins Radio Company, Dallas, Tex.

[22] Filed: Mar. 29, 1971

[21] Appl. No.: 128,769

[52] U.S. Cl. ........................325/30, 325/42, 325/65, 328/155, 333/18

[51] Int. Cl. ..............................................H03h 7/36

[58] Field of Search......................325/41, 42, 45, 30, 325/67, 346, 320, 135; 178/67, 66 R; 333/18; 328/155; 179/170; 235/164, 165

[56] References Cited

UNITED STATES PATENTS

| | | | |
|---|---|---|---|
| 3,568,067 | 3/1971 | Williford | 178/66 R |
| 3,404,229 | 10/1968 | Downey et al | 325/42 |
| 3,414,819 | 12/1968 | Lucky | 325/42 |
| 3,597,599 | 8/1971 | Melvin | 235/154 |

*Primary Examiner*—Benedict V. Safourek
*Attorney*—Robert J. Crawford and Bruce C. Lutz

[57] ABSTRACT

Circuitry for detecting and measuring distortion components in a differentially coherent phase shift keyed signal received at a receiver after transmission over a transmission facility and further circuitry for altering the amplitude and phase of the received signal by an amount indicative of the measured value. The equalizer measures both pre and post pulse distortion products in producing the adjusted output signal. The disclosure also illustrates a special preamble which may be used prior to the main message to hasten the measurement and adjustment process time over the time required if random sampled data is used in the measurement process. The equalizer algorithm utilizes the fact that the phase and amplitude of prepulse and postpulse interference of any particular pulse can be measured relative to the main pulse by making the other interference pulses and the main pulse orthogonal.

14 Claims, 25 Drawing Figures

INVENTOR
WILLIAM J. MELVIN
BY Bruce C Lutz
ATTORNEY

INVENTOR
WILLIAM J. MELVIN
BY Bruce C Lutz
ATTORNEY

INVENTOR
WILLIAM J. MELVIN

BY Bruce C Lutz
ATTORNEY

INVENTOR
WILLIAM J. MELVIN
BY Bruce C Lutz
ATTORNEY

INVENTOR
WILLIAM J. MELVIN
BY
ATTORNEY

PATENTED APR 10 1973

3,727,134

SHEET 07 OF 15

INVENTOR
WILLIAM J. MELVIN

BY Bruce C. Lutz

ATTORNEY

INVENTOR
WILLIAM J. MELVIN

BY Bruce C Lutz

ATTORNEY

INVENTOR
WILLIAM J. MELVIN
BY Bruce C Lutz
ATTORNEY

INVENTOR
WILLIAM J. MELVIN

BY [signature]
ATTORNEY

INVENTOR
WILLIAM J. MELVIN
BY Bruce C Lutz
ATTORNEY

INVENTOR
WILLIAM J. MELVIN
BY Bruce C Lutz
ATTORNEY

INVENTOR
WILLIAM J. MELVIN
BY Bruce C Lutz
ATTORNEY

INVENTOR
WILLIAM J. MELVIN
BY Bruce C Lutz
ATTORNEY

INVENTOR
WILLIAM J. MELVIN
BY Bruce C Lutz
ATTORNEY

AUTO EQUALIZER APPARATUS

The present invention is generally related to electronics and more specifically related to auto equalizers. Even more specifically, the present invention is related to an equalizer for use with differentially coherent phase shift keyed signals.

In the past few years many auto equalizers have been proposed which have operated to varying degrees of satisfaction. However, as far as is known, no satisfactory method has been proposed for equalizing differentially phase shift keyed (DC-PSK) signals. The prior art has been concentrated mainly on amplitude modulated signals of bilevel (binary) or multilevel amplitude variations. These amplitude modulated signals are adjusted to the desired frequency range by a vestigial or a single side band operation at the modulator. The demodulation process requires a carrier recovery operation which is extremely susceptible to phase jitter and phase hits encountered on the facility. The chief advantage of differentially coherent phase shift signaling is that the demodulation is relatively insensitive to these types of phase distortions.

The present invention may be used to equalize differentially coherent phase shift keyed (DC-PSK) signals.

Briefly, this is accomplished by measuring the distortion products or intersymbol interference and then subtracting or cancelling these products from the received signal before the final data decision is made. The distortion product measurement depends upon the fact that the intersymbol interference can be described as an additive component with a fixed or time invariant magnitude and phase relative to the main data pulse or symbol with each distortion component having a unique magnitude and phase. An equalizer measurement algorithm is described whereby the demodulator output is rotated by an angle that is equal to the measured phase difference between the present main pulse and the main pulse *k* transmission symbols earlier. The rotated output samples are then accumulated or averaged over a selected preamble interval. The preamble data and interval are such that a particular distortion product can be measured independent or orthogonal to the other products. Any particular product is selected by the value of the rotational angle utilized. Once the distortion products are known, they can be cancelled from the demodulator output by rotating each product by the conjugate or negative of the phase angle used for measuring. One embodiment of the averaging over a selected preamble interval is described in this specification. An alternative distortion measurement technique which requires random modulator data and conventional digital low pass filtering for averaging, is described analytically. This technique uses the same rotational algorithm as that required for the preamble approach. The invention described can be easily modified to initially adjust on the preamble and then switch to a track mode which uses random modulator phase shifts and conventional sample data low pass filter averaging.

Reference is used in two senses. First, the received signal is multiplied by a carrier reference and its quadrature to obtain the inphase and quadphase signal envelope components. This reference is a sinewave and its quadrature is a cosine signal. The phase of the sinewave relative to the received signal is the desired data. Second, the demodulator output comprises the original or main pulse plus distortion pulses. The main pulse is considered a reference relative to the distortion pulses or products sample is used in two senses. First, the received signal is sampled by an analog to digital converter block 202 in FIG. 11. The ADS sample rate is is such that 12 of these samples are taken each transmission symbol or pulse. Secondly, once each transmission symbol or pulse a set of X and Y outputs, 56 and 58 respectively from FIGS. 1 and 11, are available or are sampled and these are the sample values $I_{-1}$, $I_0$, $I_1$, . . . and $Q_{-1}$, $Q_0$, $Q_1$, . . . as illustrated in FIG. 2.

A more detailed description of this equalizer algorithm principle is discussed in the section entitled "-General Response Measurement Discussion" and "Distortion Correction."

It is thus an object of the present invention to produce improved auto equalizer apparatus.

Other objects and advantages of the present invention may be ascertained from a reading of the specification and appended claims in conjunction with the drawings wherein:

Figure 1:
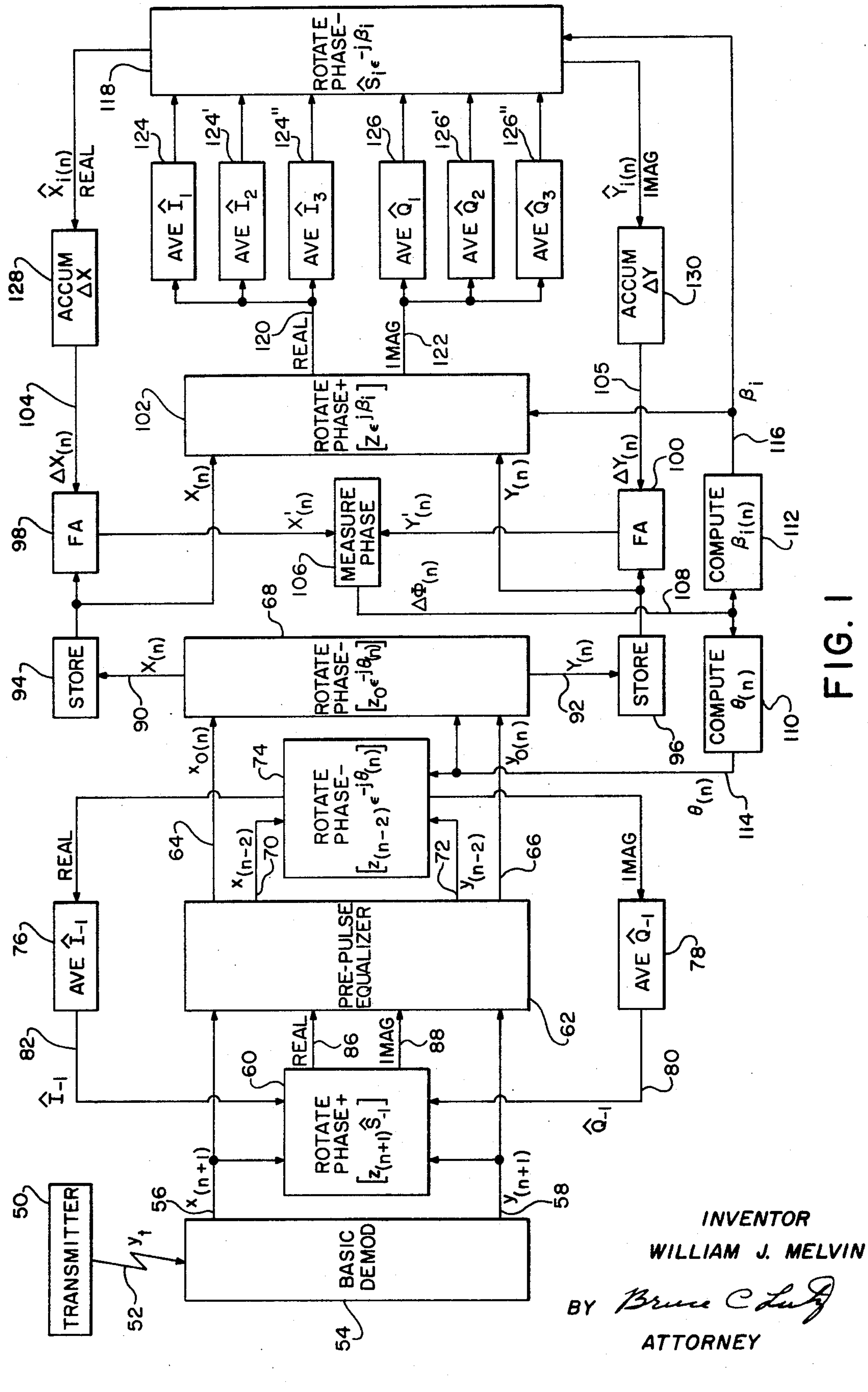
FIG. 1 is a block diagram of the overall invention.
Figure 4:
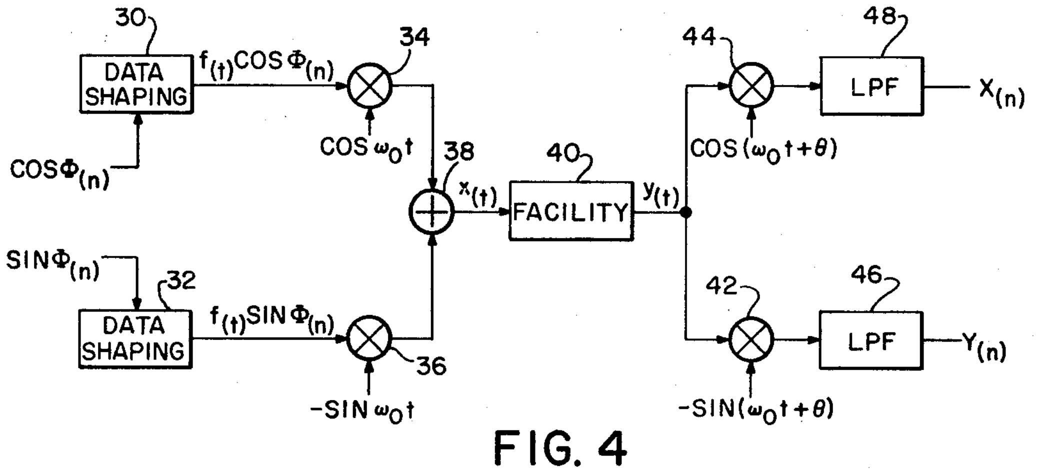
FIG. 4 is a more detailed block diagram illustration of the modulating and demodulating portion of the system.
Figure 11:
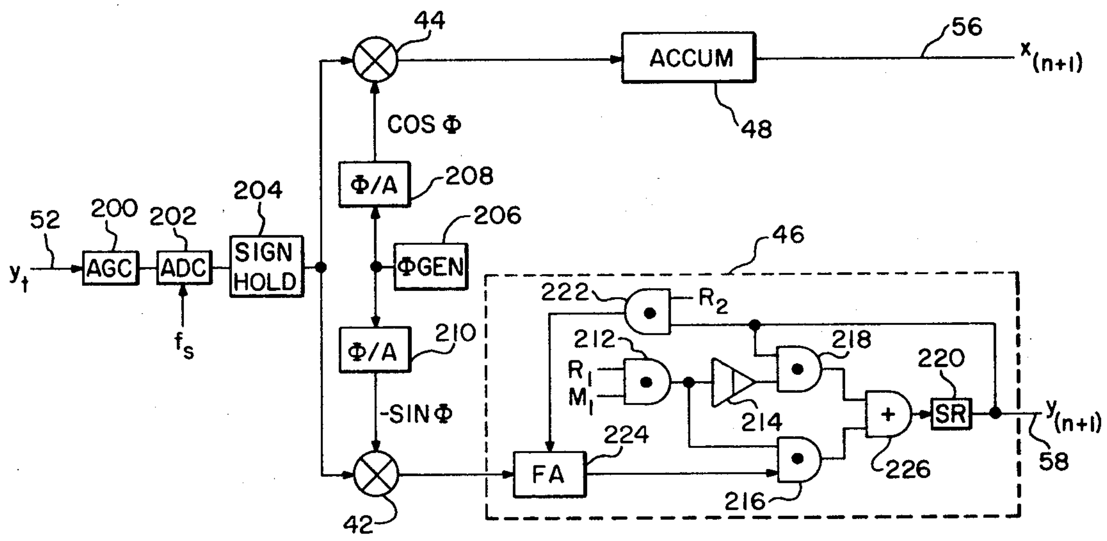

FIG. 11 provides more detail as to the basic demodulator of FIGS. 1 and 4.

Figure 12:
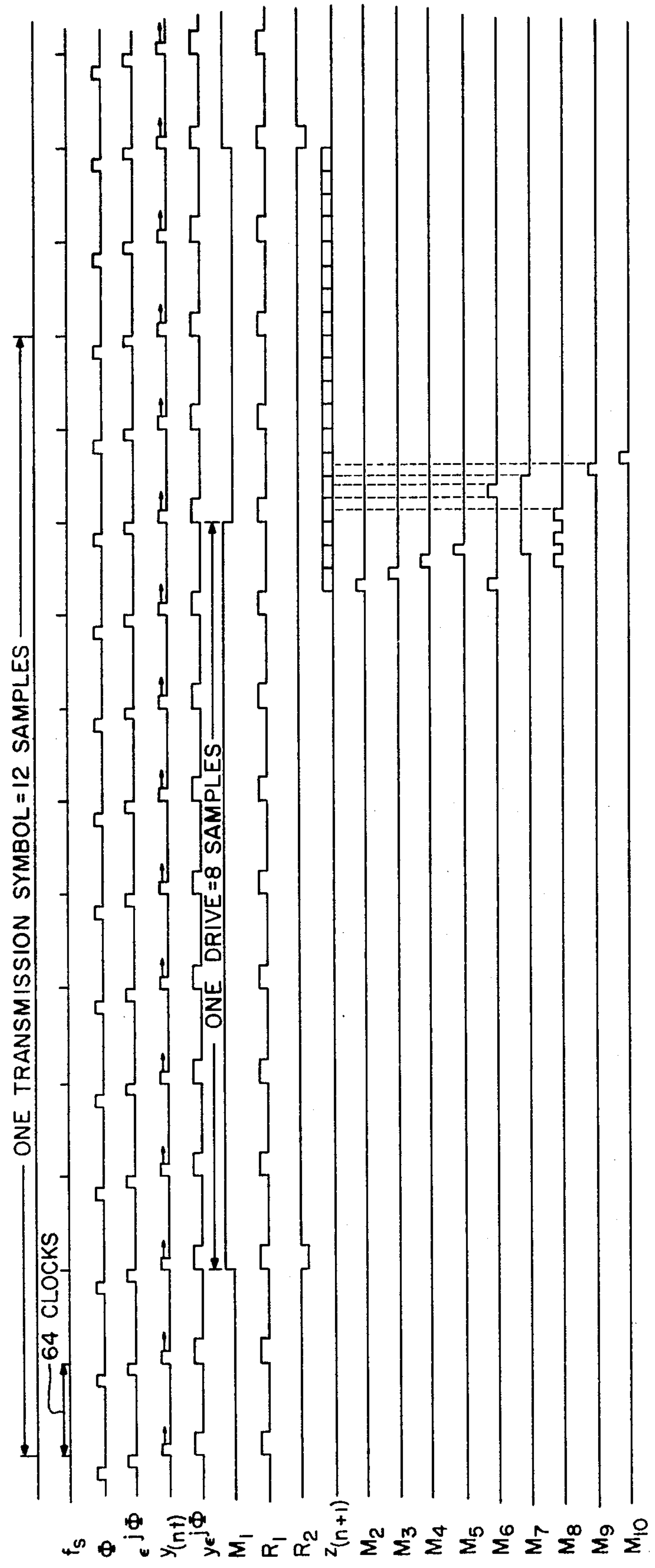

FIG. 12 is a collection of waveforms for use in explaining FIG. 11.

Figure 13:
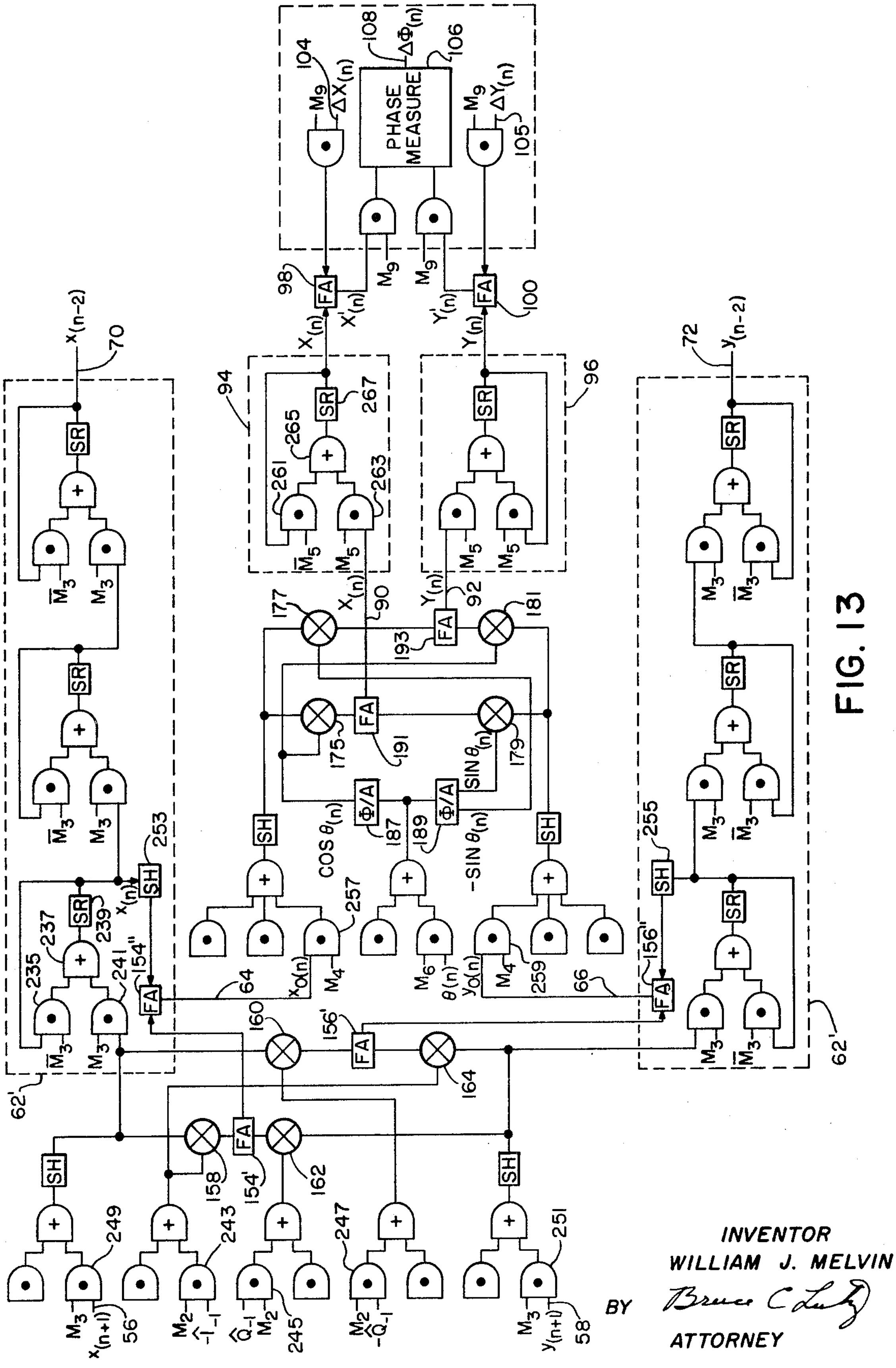

FIG. 13 is a more detailed diagram of the prepulse equalizer.

Figure 14:
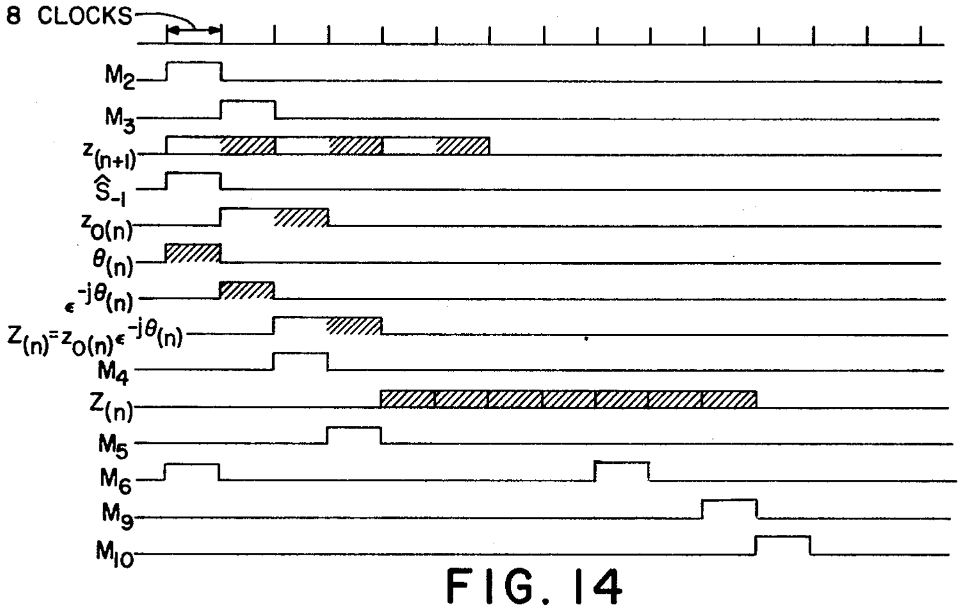

FIG. 14 is a series of waveforms for use in explaining the operation of FIG. 13.

Figure 15:
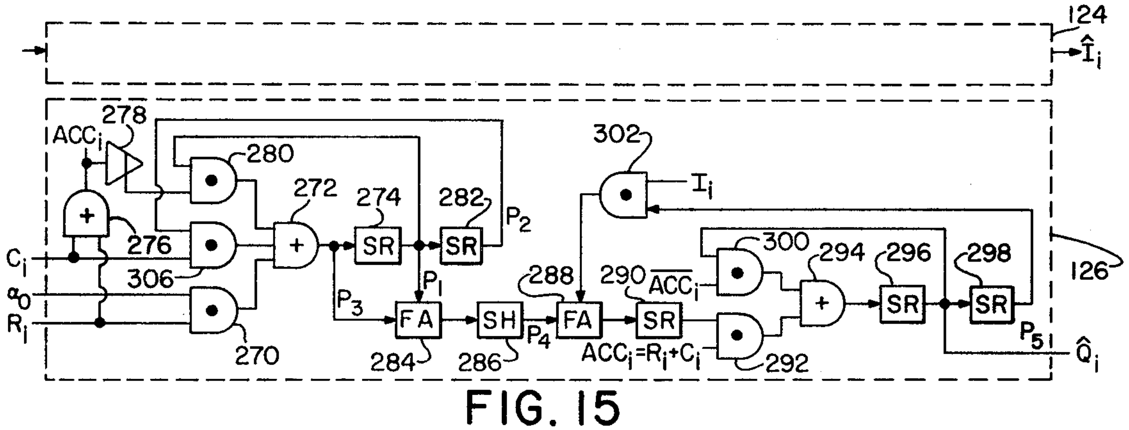

FIG. 15 illustrates one of the averaging block implementations which may be used in the equalizer of FIG. 1.

Figure 16:
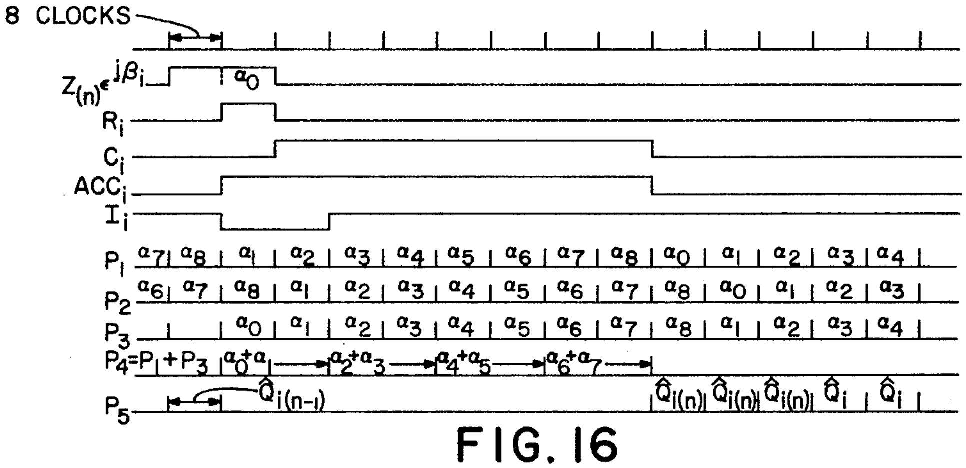

FIG. 16 is a collection of waveforms for use in describing the operation of FIG. 15.

Figure 17:
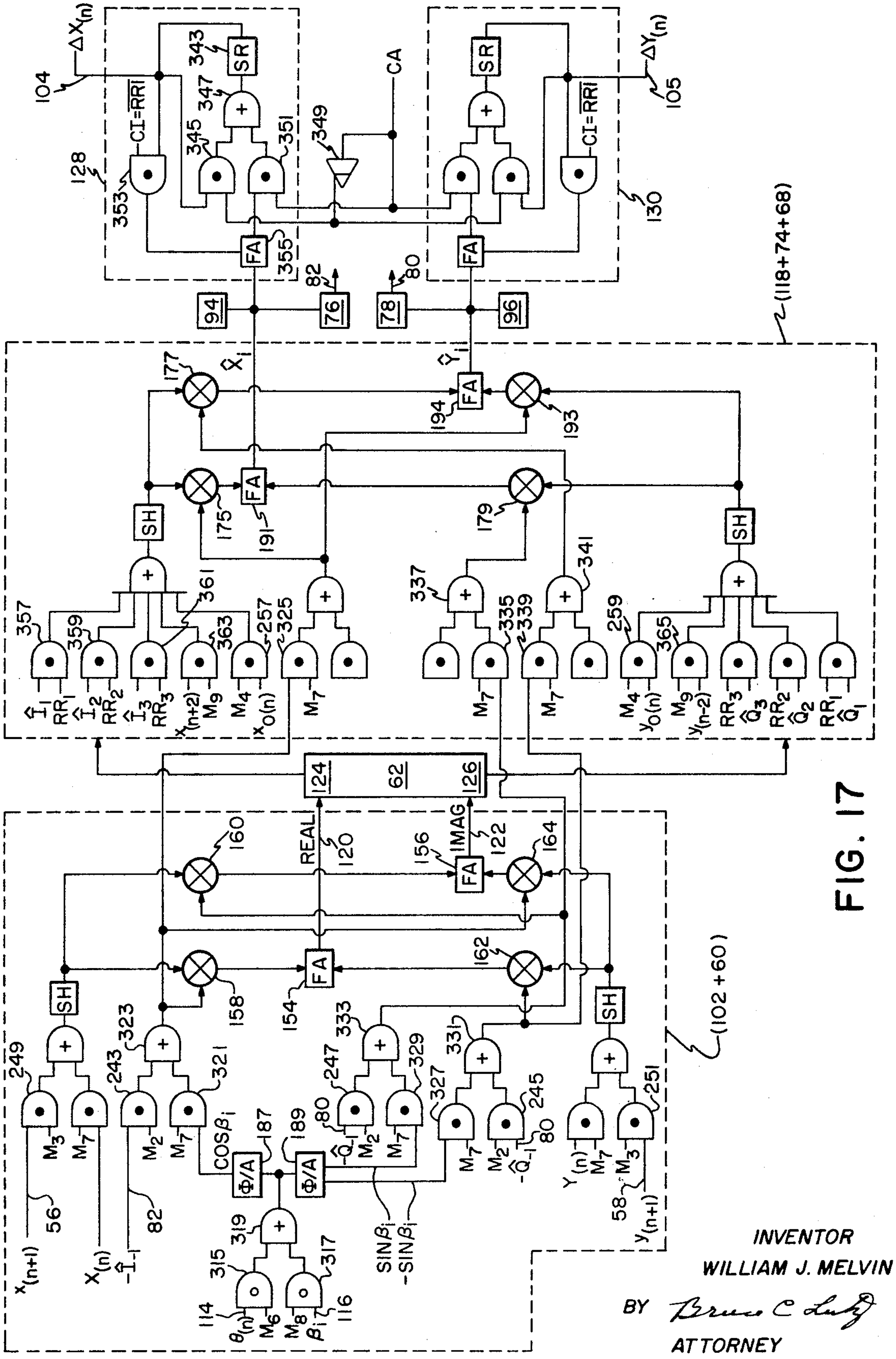

FIG. 17 is a detailed circuit diagram of the measuring section for postpulse distortion in FIG. 1 in combination with the compute postpulse distortion correction section.

Figure 18:
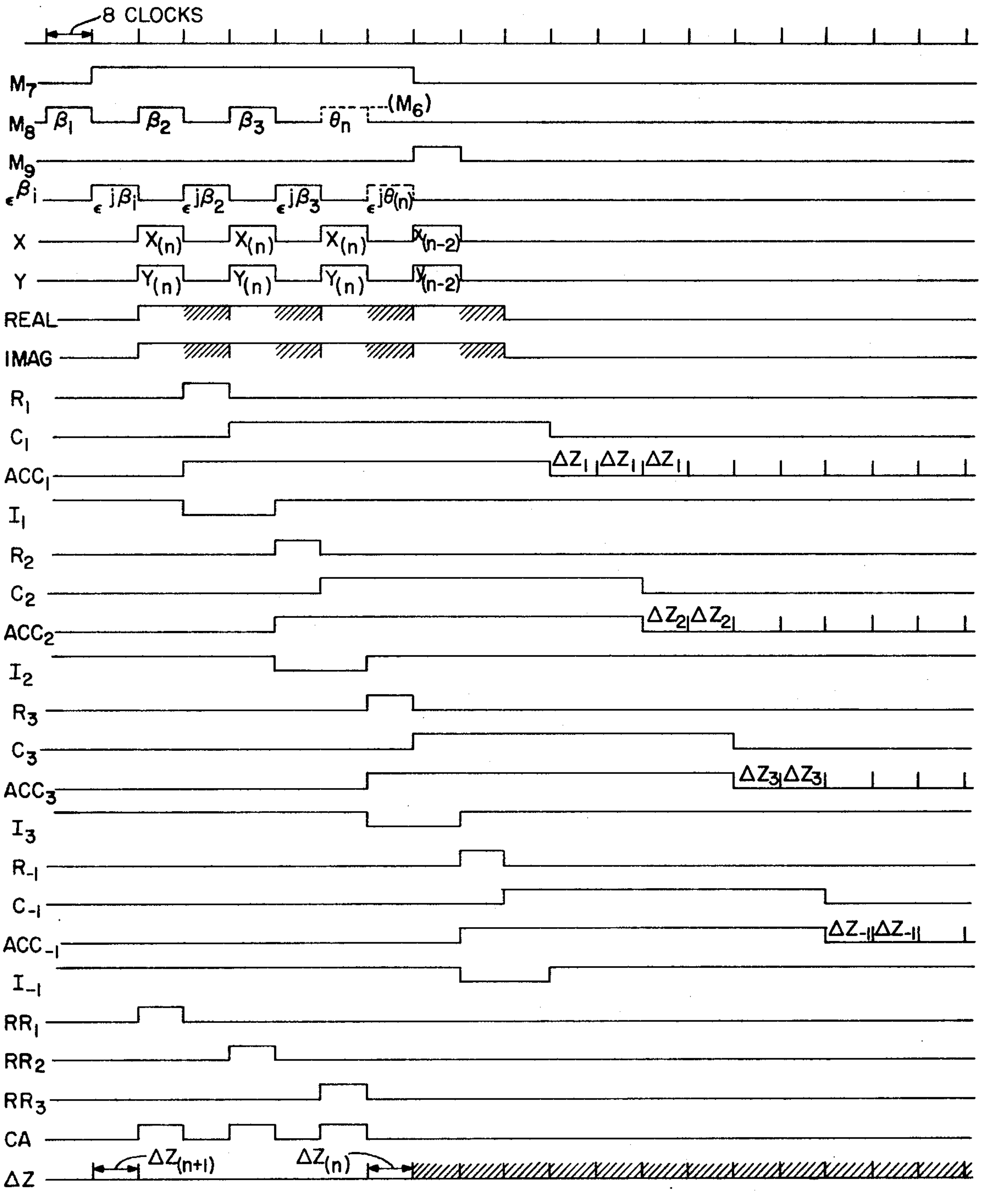

FIG. 18 is a collection of waveforms for use in explaining FIG. 17.

Figure 19:
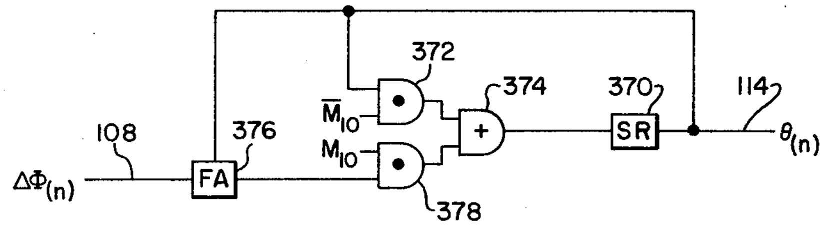

FIG. 19 is a detailed block diagram for computing the accumulated phase angle to date.

Figure 20:
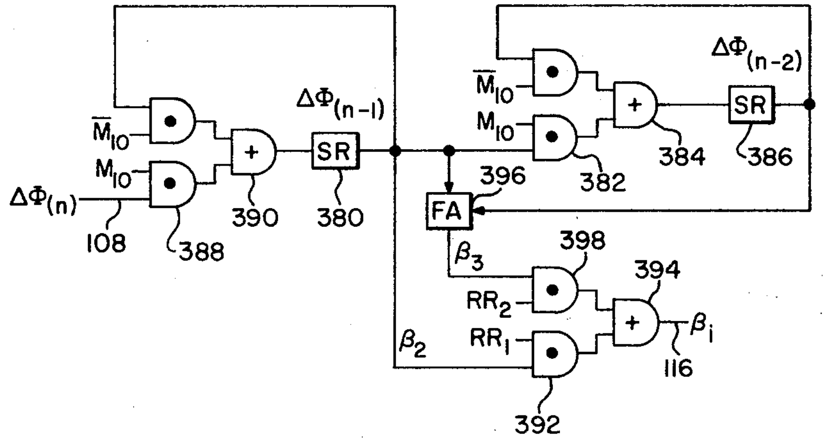

FIG. 20 is a detailed circuit block diagram for providing a running indication of the phase angle of the present data symbol with respect to the previous three data symbols.

Figure 21:
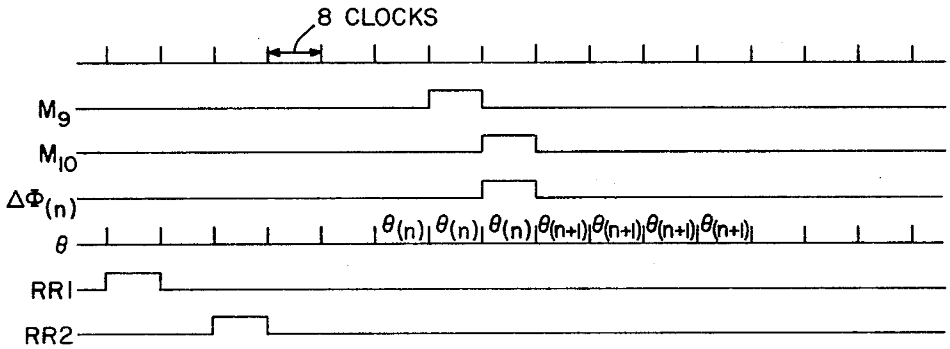

FIG. 21 is a waveform diagram for use in explaining FIGS. 19 and 20.

Figure 22:
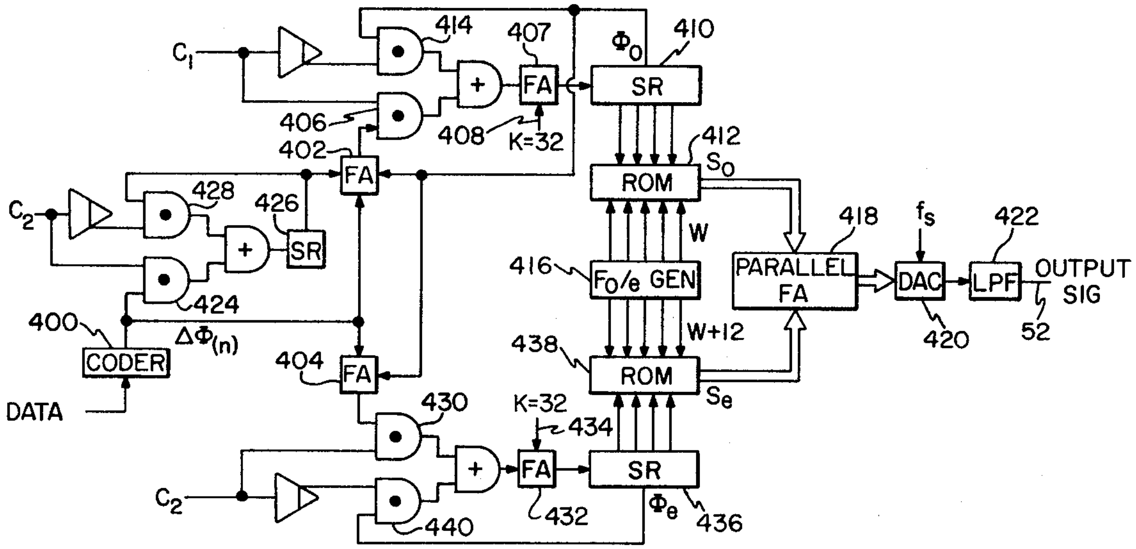

FIG. 22 is a block diagram of an embodiment of a modulator which may be used in FIGS. 1 and 4.

Figure 25:
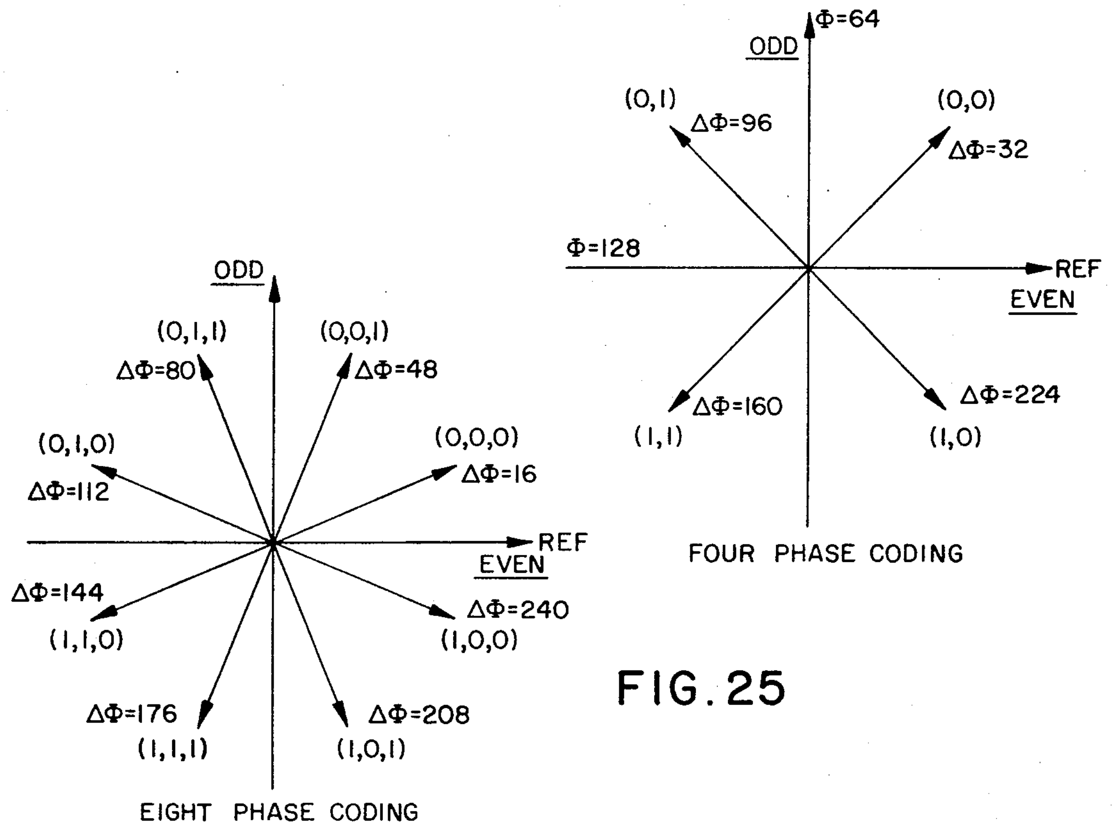
Figure 23:
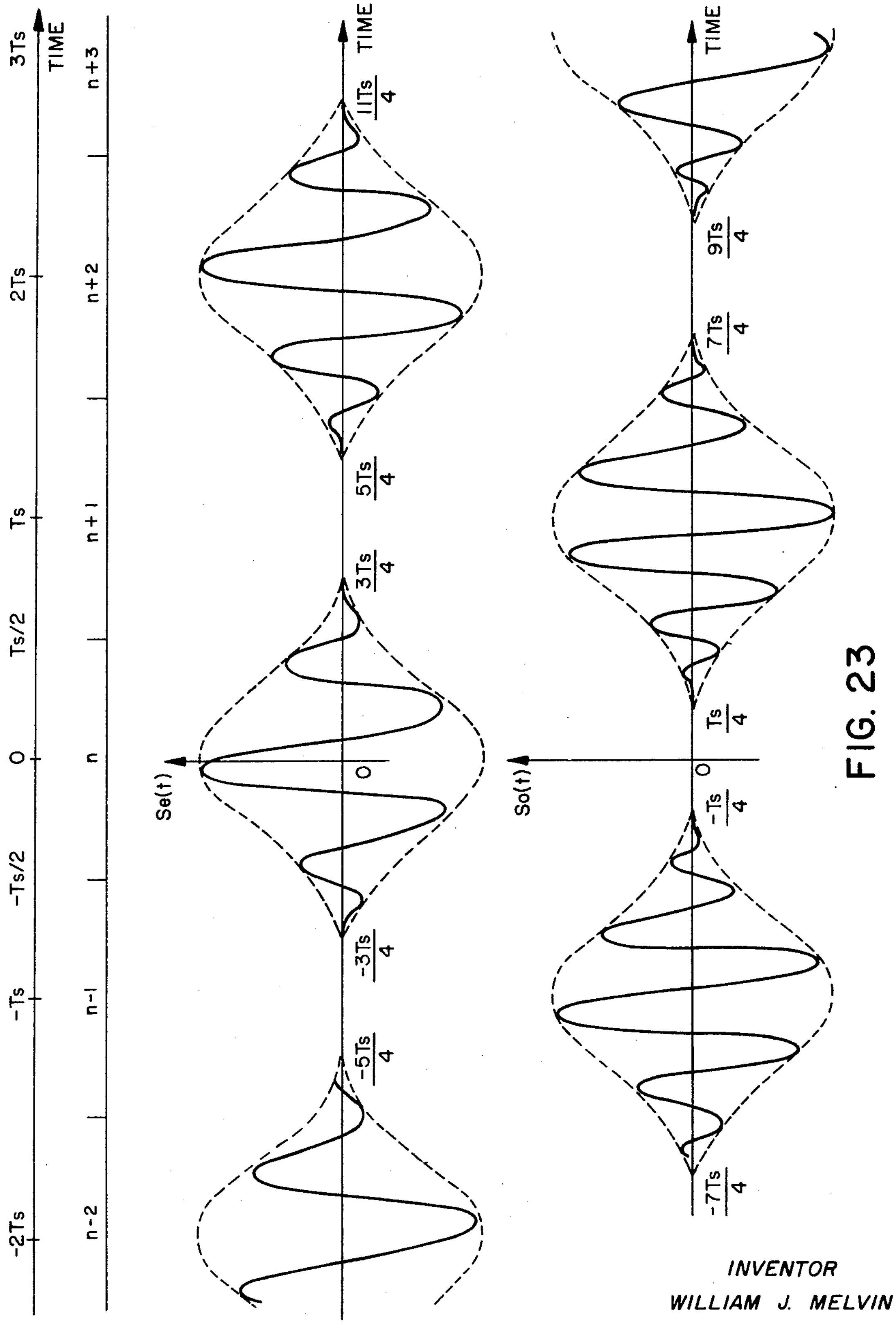
Figure 24:
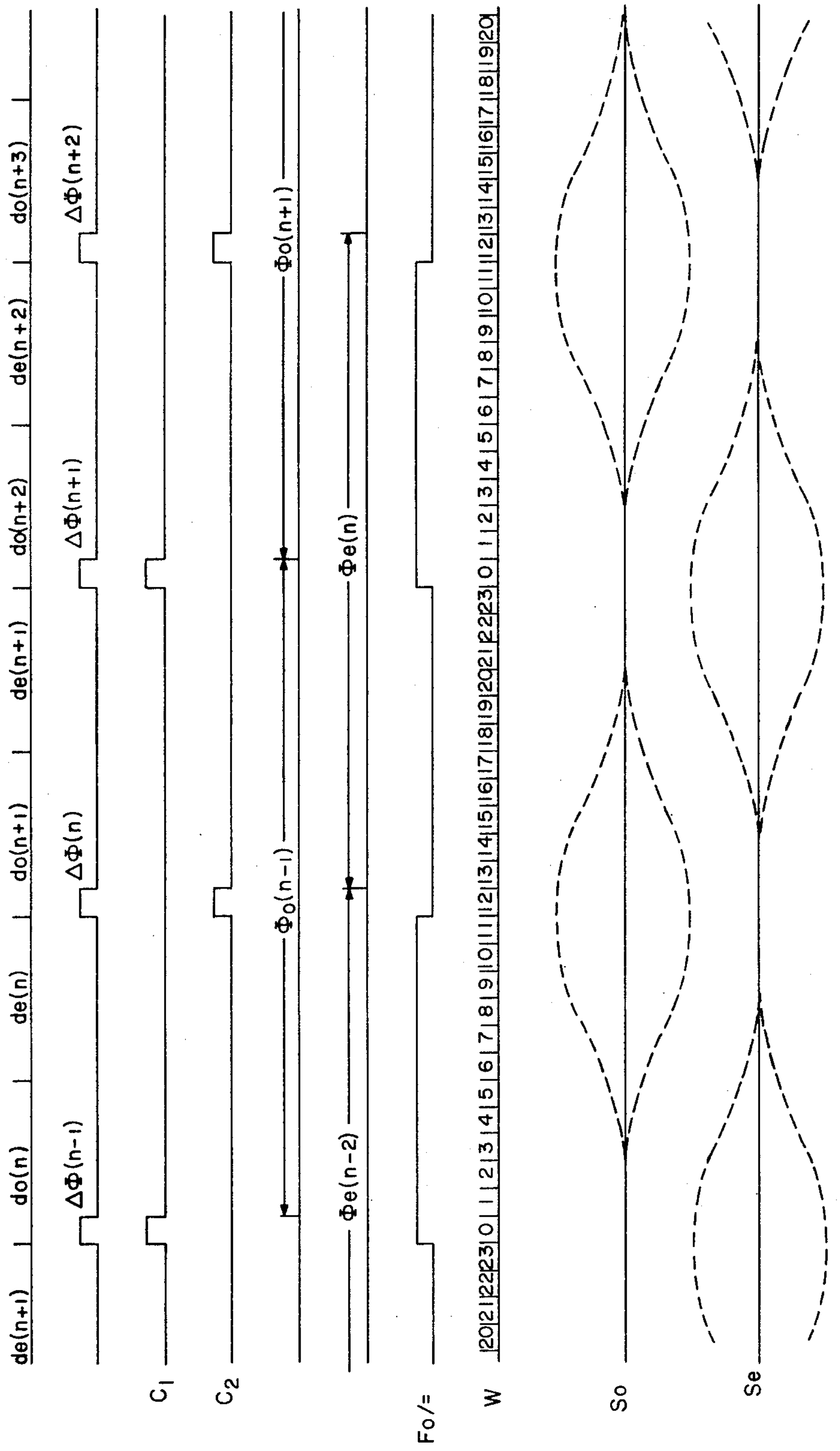

FIGS. 23–25 are waveforms for use in explaining FIG. 22.

BACKGROUND

FIG. 1

Figure 2:
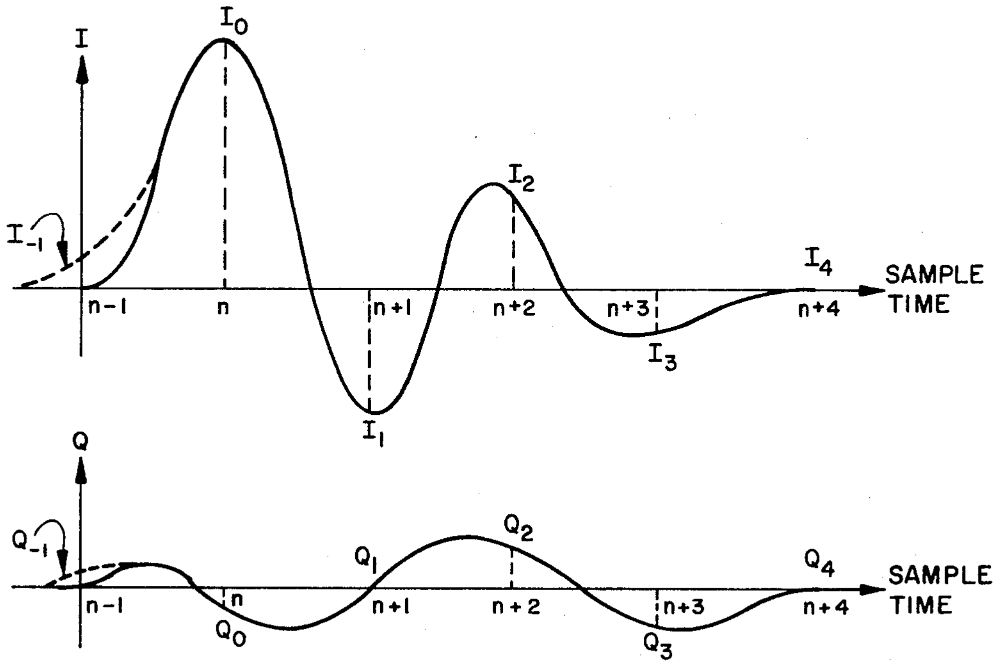
FIGS. 2 and 3 are time and vector responses of a system to a given data symbol.

The impulse response of a two-channel single tone modem (modulator-demodulator system) connected to a facility with nonlinear phase and/or amplitude-frequency characteristics comprises a set of outputs which are transient in nature. The outputs are essentially the base band or low pass equivalent of the inphase, I, (real) and quadrature phase, Q, (imaginary) response of the facility to a modulator pulse centered at the demodulator carrier reference frequency. Two typical demodulator output signals, I and Q, are shown in FIG. 2. A pulse is applied to the facility at a given time. This applied pulse results in a main contribution appearing at sample time interval N with component contributions occurring until time interval N + 4. The solid line waveform in this illustration indicates that there is no prepulse distortion although in actual fact, many facilities do broaden the main pulse enough so that prepulse distortion also may occur. This prepulse distortion is illustrated by a dash line in FIG. 2 for both the I and Q phase response graphs. The Q graph basically illustrates the fact that there may be phase distortion in addition to amplitude distortion contributions.

FIG. 3

The set of sample values $I_{-1}$, $Q_{-1}$, $I_0$, $Q_0$, etc., can be considered as components of a two dimensional vector whose basis vectors are the orthogonal inphase and quadrature phase carrier reference signal as an axis. As defined herein, two vectors or signals are orthogonal if when multiplied by each other and integrated over a specified variable as unit of time equal zero. (See Mathematical Handbook for Scientists and Engineers by Korn and Korn Sec. 19.2–3 published by McGray Hill (1961). The demodulator then extracts the projection of the facility output signal on these two basis vectors. The facility response is shown in vector form in FIG. 3. The component along the I axis being the inphase voltage sampled at time $n-1$, $n+1$, $n+2$ and the component along the Q axis being the quadrature phase sample voltage. The modem-facility response can thus be represented by the vectors $S_{-1}$ occurring at $n-1$ time, $S_0$ occurring at time $n$, etc. While only the components of a single pulse has been shown for clarity, it will be realized that in normal practice a data sample would occur at each of the indicated times $n-1$, $n$, $n+1$, etc. Thus, the distortion products of various data symbols are all superimposed upon the main data symbol received and these distortion products can affect both the amplitude and the phase of the received signal. Accordingly, the received signal must be adjusted in amplitude and phase to compensate for the distortion produced by the components applicable to other data symbols occurring previously and in the future. While it is of course not possible for a pulse not yet transmitted to affect a pulse already transmitted, a given data symbol will be transmitted by a transmitter along with at least one subsequently transmitted data pulses both of which are on the transmission line prior to the time that the receiver receives the given data symbol. Thus, the distortion characteristics of the facility or line will, in some cases, produce a distortion on the given data symbol by a data symbol which is subsequently transmitted. This is what will be referred to in this specification as prepulse symbol interference or distortion.

FIG. 4

A general block diagram of a modem facility configuration is illustrated in FIG. 4. The signals required to describe the modem and equalizer operation are defined by equations 1 through 7 below.

$$x_{(t)} = f_{(t)}\mathrm{COS}\Phi_{(n)}\mathrm{COS}\omega_0 t - f_{(t)}\mathrm{SIN}\Phi_{(n)}\mathrm{SIN}\omega_0 t \qquad (1)$$

$$x_{(t)} = f_{(t)}\mathrm{COS}[\omega_0 t + \Phi_{(n)}] \qquad (2)$$

$$y_{(t)} = (I\,\mathrm{COS}\Phi_{(n)} - Q\,\mathrm{SIN}\Phi_{(n)})\,\mathrm{COS}\omega_0 t - (Q\,\mathrm{COS}\Phi_{(n)} + I\,\mathrm{SIN}\Phi_{(n)})\,\mathrm{SIN}\omega_0 t \qquad (3)$$

$$X_{(n)} = (I\,\mathrm{COS}\Phi_{(n)} - Q\,\mathrm{SIN}\Phi_{(n)})\,\mathrm{COS}\theta + (Q\,\mathrm{COS}\Phi_{(n)} + I\,\mathrm{SIN}\Phi_{(n)})\,\mathrm{SIN}\theta \qquad (4)$$

$$X_{(n)} = I\,\mathrm{COS}(\Phi_{(n)} - \theta) - Q\,\mathrm{SIN}(\Phi_{(n)} - \theta) \qquad (5)$$

$$Y_{(n)} = (Q\,\mathrm{COS}\Phi_{(n)} + I\,\mathrm{SIN}\Phi_{(n)})\mathrm{COS}\theta + (I\,\mathrm{COS}\Phi_{(n)} - Q\,\mathrm{SIN}\Phi_{(n)})\,\mathrm{SIN}\theta \qquad (6)$$

$$Y_{(n)} = I\,\mathrm{SIN}(\Phi_{(n)} - \theta) + Q\,\mathrm{COS}(\Phi_{(n)} - \theta) \qquad (7)$$

where

I = inphase facility response to pulse $\Phi_{(n)} = 0$

Q = quadrature phase facility response to pulse $\Phi_{(n)} = 0$

The COS and SIN quadrature phase signals are supplied to data shaping blocks 30 and 32 for processing in accordance with predetermined or available information data. The outputs of the blocks 30 and 32 are then the inputs modified in accordance with the shaping function. These functions are then multiplied by carrier signals and added to produce the output $x_{(t)}$ as shown in Equation (2). This then is the modulated single tone signal with a center frequency $\omega_0$, phase modulated $\omega_{(n)}$ pulse, with a shaping characteristic $f_{(t)}$. The facility output is provided in Equation (3) which comprises combinations of $I$ and $Q$ outputs on two orthogonal reference carriers COS $\omega_0$t and SIN $\omega_0 t$. The demodulator outputs $X_{(n)}$ and $Y_{(n)}$ then represent the projections of $y_{(t)}$ on COS($\omega_0 t + \theta$) and on −SIN($\omega_0 t + \theta$). The angle $\theta$ incorporates both fixed phase and frequency errors. The inphase projection $X_{(n)}$ , Equation (5), and quad phase projection $Y_{(n)}$, Equation (7), are the functions of the facility response $I$ and $Q$, the modulator phase $\Phi_{(n)}$, and the demodulator phase $\theta$.

In FIG. 4 the outputs from blocks 30 and 32 are multiplied in devices 34 and 36, respectively, by the COS and SIN of the carrier, respectively, and added in a block 38. The output of block 38 is then transmitted through a facility 40 to SIN and COS demodulator multipliers labeled 42 and 44, respectively. The outputs of these blocks 42 and 44 are applied to low-pass filters 46 and 48, respectively, to produce the outputs $Y_{(n)}$ and $X_{(n)}$.

Figure 5:
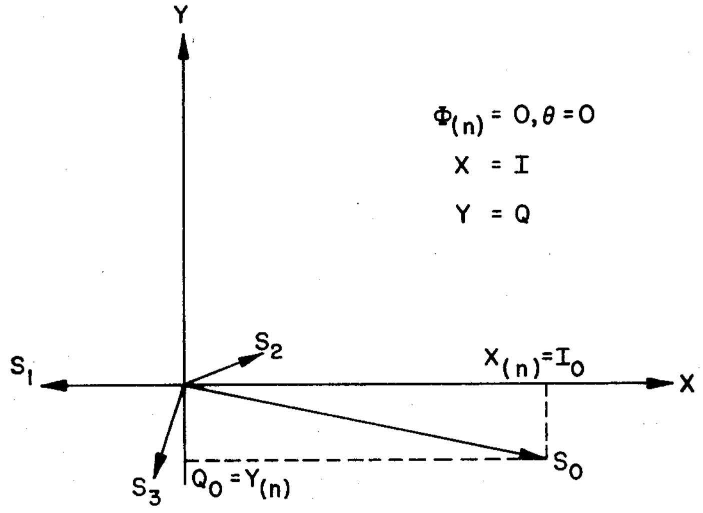
FIG. 5 and FIG. 6 are vector diagrams for use in explaining FIG. 4.
Figure 6:
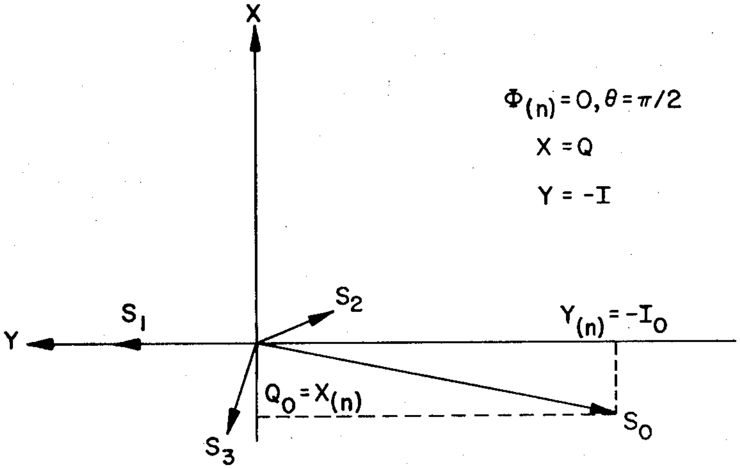

FIGS. 5 and 6

FIGS. 5 and 6 illustrate the X and Y components of the received signal using different values for $\Phi$ and $\theta$ to illustrate that the relationship of the received vectors with respect to each other is independent of the demodulator phase $\theta$. All received vectors remain invariant relative to the main pulse $S_0$. The magnitude of each vector $S_i$ and its phase relative to $S_0$ are independent of the modulator angle $\Phi_{(n)}$ and the demodulator angle $\theta$.

GENERAL DESCRIPTION

FIG. 1

In FIG. 1 a block 50 contains a transmitter which supplies analog signals to be transmitted over a transmission line 52. The transmitter 50 may contain a digitalized tone generator such as shown in a copending application in my name and entitled "Digitalized Tone Generator" filed June 16, 1969, assigned to the same assignee as the present invention, and having Ser. No. 833,460. A demodulator 54 receives the signal $y_t$ from the line 52 and controls the gain of the incoming signal while converting the signal from analog to digital and producing as an output, on lines 56 and 58, X and Y components of the data symbol received as compared to a set of carrier reference signals 47 and 49 of FIG. 4. These components 56 and 58 are each applied to a rotate phase positive block 60 and to a prepulse equalizer block 62. The block 62 has two sets of X and Y outputs wherein the first set are labeled 64 and 66 and contain, respectively, the X and Y components of the present signal equalized for prepulse distortion and labeled $X_{0(n)}$ and $Y_{0(n)}$. The two leads 64 and 66 are supplied to a rotate phase minus block 68. The block 62 also has output leads 70 and 72 which supply inputs $X_{(n-2)}$ and $Y_{(n-2)}$ to a rotate phase minus block 74. These signals are the X and Y components of two pulses ago with respect to the given set of demodulation references (47 and 49 of FIG. 4). The block 74 rotates the X and Y inputs by a given phase angle $\theta_{(n)}$ on line 114 to supply outputs to two averaging circuits 76 and 78 which respectively average the real and imaginary components of the inputs supplied on leads 70 and 72 and rotated in 74 and supply on output leads 80 and 82 the imaginary and real estimated values of the Q and I components, respectively, of the previous pulse interference with respect to a given reference pulse. The estimated value of a signal is distinguished by the use of a hat (ˆ) over a particular symbol. These estimated values are supplied to positive rotate phase block 60 which also receives the inputs from leads 56 and 58. Outputs from positive rotate phase block 60 are supplied on the real 86 and imaginary 88 leads to the prepulse equalizer block 62. It is the outputs 86 and 88 which are subtracted from the signal on leads 56 and 58 to produce the outputs on leads 64 and 66 which are now substantially equalized for prepulse distortion. Block 68 supplies output signals on leads 90 and 92 which are indicative of negative rotation in phase $\theta$ on lead 114 from the input signals. The outputs supplied on leads 90 and 92 are stored in blocks 94 and 96, respectively, before being supplied to full adders 98 and 100, respectively. The outputs of blocks 94 and 96 are also supplied to a rotate phase positive block 102 which is part of the postpulse distortion measurement section. The full adders 98 and 100 receive inputs on leads 104 and 105 which are obtained from the distortion correction section and are indicative of the total combined distortion components to be subtracted from the signals stored in 94 and 96. These components are subtracted and supplied by the full adders 98 and 100 to a phase measurement block 106. This block measures the difference in phase between the last signal and the present signal and supplies this output as $\Delta\Phi_{(n)}$ on lead 108 to a compute total phase angle block 110 and to a compute phase difference angle block 112. Block 110 supplies an output on lead 114 to blocks 74 and 68. Block 112 supplies outputs on an output lead 116 to block 102 and to a rotate phase negative block 118. This output may be in parallel or may be time shared as illustrated in this embodiment of the invention. Block 102 provides a time shared output on leads 120 and 122 to a plurality of averaging circuits 124, 124′, and 124″ for the real component and 126, 126′, and 126″ for imaginary component. The outputs of each of these blocks 124 and 126 are supplied to the rotate phase block 118 where, after each being individually rotated, they are combined in accumulation blocks 128 and 130 which are connected to the output of block 118. The blocks 128 and 130 provide the signals supplied on leads 104 and 105, mentioned previously, to the full adders 98 and 100.

FIG. 7

Figure 7:
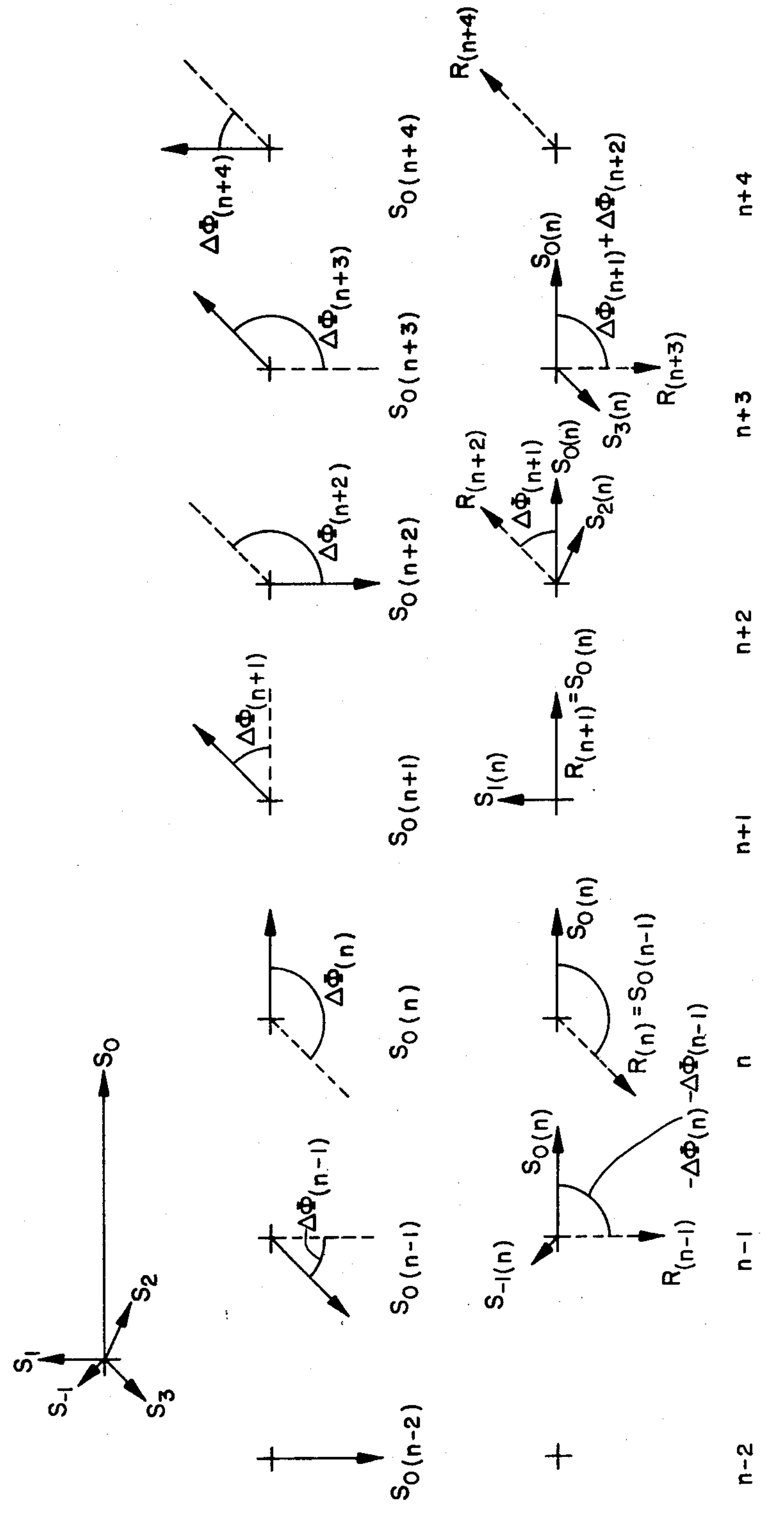
FIG. 7 is utilized in explaining the measurement of the distortion product.

As will be realized by those skilled in the art, in DCPSK, the phase of the previously received signal is used as a reference in measuring the phase of the presently received signal. In FIG. 7 the middle and bottom vector diagram portions are illustrated on a continuing time basis from time $(n + 2)$ to $(n - 4)$ where $S_{0(n)}$ is a reference pulse occuring at sample time $n$. At the top of FIG. 7 is shown a vector diagram of the relative angles and amplitudes of various distortion components of the main pulse $S_0$. These distortion components include the prepulse distortion component $S_{-1}$ and post pulse distoration components $S_1$, $S_2$, and $S_3$. The middle portion of FIG. 7 illustrates the transmitted signal received pulse sequence of the main at each of the recited instances of time. However, $S_o$ is shortened from that previously shown on the top line of FIG. 7 to economize on space. It further shows the $\Delta\Phi$ angle output signal appearing on each occasion at lead 108 of FIG. 1. The lower portion of FIG. 7 on the other hand illustrates the angle of the continuously updated reference at that point in time with respect to each of the various components of the signal $S_0$ which is received at time $n$. It may be noted that the reference signal vector R is always at the same angle as the angle of the previous information signal vector $S_0$. Since it is assumed that the prepulse contribution of the pulse at time $n$ is of no significance at time $n - 2$, nothing is shown in this portion of the diagram. At $n - 1$ there is the contribution of the $S_{-1(n)}$ component. The signal $S_{O(n)}$ vector is not in existence in the demodulator at $n - 1$ time but is shown because the angle $-\Delta\Phi_{(n)}-\Delta\Phi_{(n-1)}$ can be utilized in measuring and correcting for prepulse distortion. At time $n$ the main pulse $S_{0(n)}$ is shown while at $n + 1$ the $S_{1(n)}$ signal is shown with respect to the reference $R_{(n+1)}$, which, in this case, is equal to the previously received signal $S_{0(n)}$. The same applies to the rest of the signals with the example showing that at $n + 4$ there is no significant contribution to the $n + 4$ pulse.

FIG. 8

Figure 8:
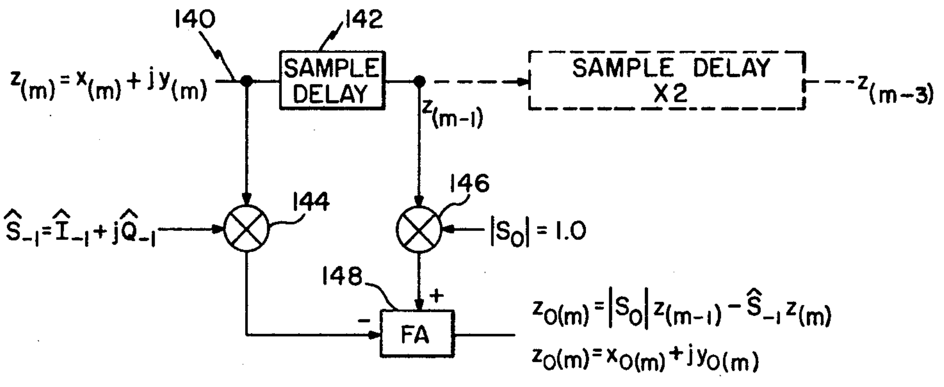
FIGS. 8 and 9 are general and detailed block diagrams of the prepulse equalizer section of FIG. 1.

As previously indicated, FIG. 8 is a generalized block diagram illustrating the concept utilized in designing blocks 60 and 62. The input signal is applied on a lead 140 to a sample delay 142 and a multiplying circuit 144. The output of sample delay 142 is supplied through multiplying circuit 146 to a full adder 148 which also receives an input from multiplying circuit 144. Multiplying circuit 144 receives, in addition, an estimated value of the prepulse interference to be received while multiplier 146 receives a value which is indicative of the present main pulse or signal set to unity. If the input is already adjusted to unity at line 140, the multiplier 146 may be eliminated. The output of full adder 148 is a value which is indicative of the input with the prepulse distortion removed. As will be apparent later, the multiplication in multiplier 144 produces a further prepulse distortion term. However, this is roughly equivalent to the estimated value of $(S_{-1})^2$ and therefore is of such a small magnitude compared with the amplitude of the main pulse that it may be disregarded in the equalization process. The signals $Z_{(m)}$ and $Z_{0(m)}$, the operations, and the algorithms are generalized for the two dimensional vector case.

FIG. 9

Figure 9:
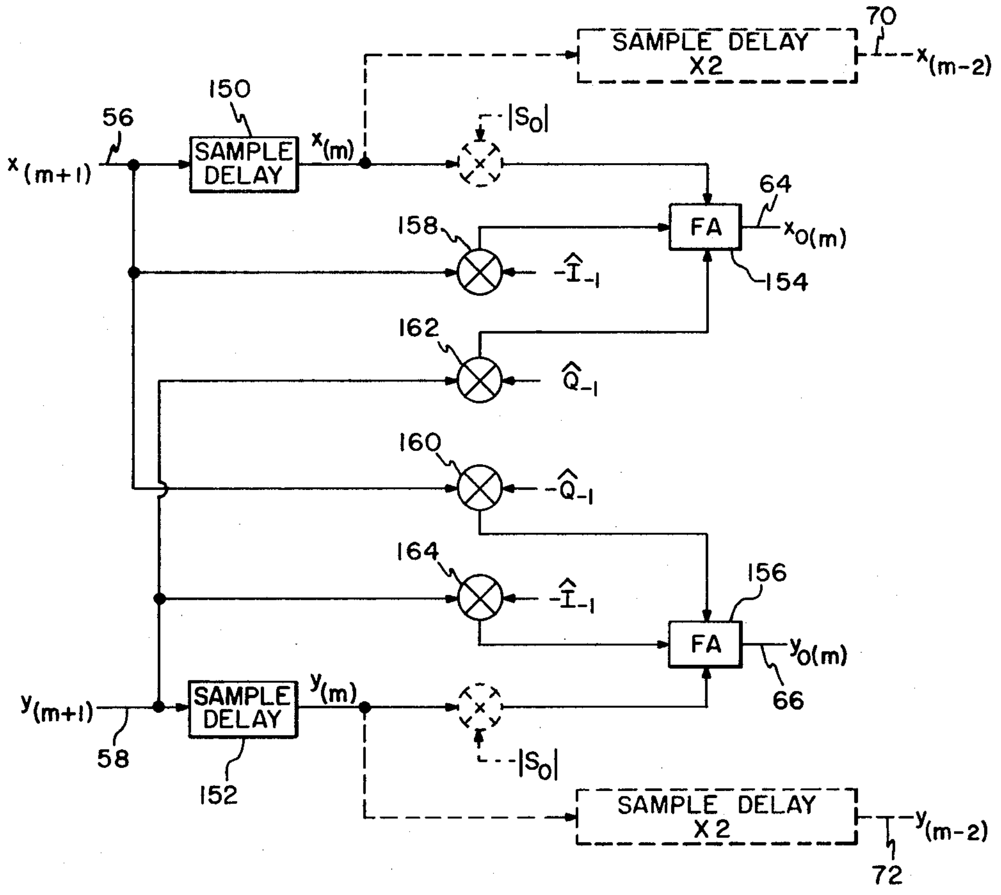

FIG. 9 utilizes some of the same designations as shown in FIG. 1 where these are appropriate to illustrate the position in FIG. 1 which FIG. 9 takes. The same conditions are utilized for many of the following figures in relating back to FIG. 1.

In FIG. 9 sample delays 150 and 152 are connected to receive signals from leads 56 and 58, respectively. These delay blocks correspond to delay 142 of FIG. 8. The outputs of these two delay blocks are supplied to full adders 154 and 156, respectively. The outputs of these blocks 150 and 152 are also each supplied to sample delay blocks to delay the signal by two data symbol time periods for producing the signals illustrated on leads 70 and 72 of FIG. 1. The signals supplied on lead 56 are also supplied to a pair of multiplying circuits 158 and 160 which respectively receive $\hat{I}_{-1}$ and $-\hat{Q}_{-1}$. The input 58 is supplied to a pair of multipliers 162 and 164 which respectively receive $\hat{Q}_{-1}$ and $-\hat{I}_{-1}$. The two multipliers 158 and 162 supply further inputs to full adder 154 while the multiplying circuits 160 and 164 supply further inputs to full adder 156. As previously indicated in conjunction with FIG. 8 there is no requirement to multiply times the absolute value of the presently received pulse if the input is set to a unity main pulse value. However, if such multiplication is desired, the multiplying action may occur immediately prior to the full adders 154 and 156 as shown by dash line multipliers having a $|S_0|$ input.

FIG. 10

Figure 10:
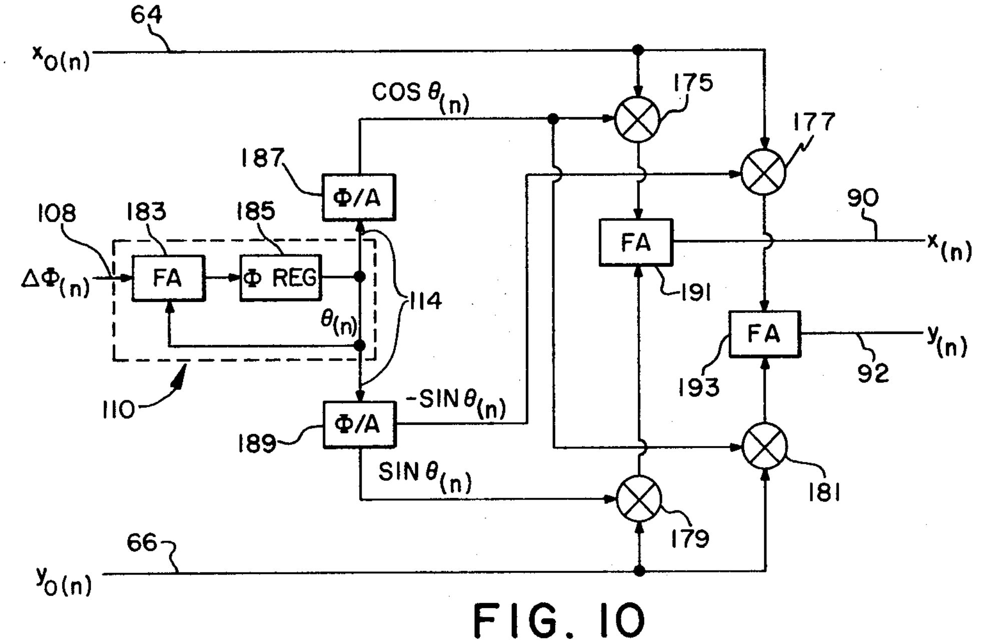
FIG. 10 illustrates the phase update or phase rotate section of FIG. 1.

In FIG. 10 the X and Y signals are supplied to a plurality of multiplying and full adder circuits comprising a phase vector rotation circuit (block 68 of FIG. 1). The vector represented by the signals on 64 and 66 is rotated by the angle appearing on lead 114 and then separated into its components again to produce the rotated components 90 and 92. It must be stressed that the X cannot and is not rotated by a predetermined angle value but rather the vector which the X and Y components represent is rotated and then rebroken into its new components this rotational algorithm is described by equations 45 and 46 infra. Lead 64 is connected to one input to each of two multiplying circuits 175 and 177. Lead 66 is connected to multiplying circuits 179 and 181. The lead 108 is connected to a full adder 183 whose output is connected to a register 185 having an output connected back to supply a further input to full adder 183 and also to supply inputs to two phase to analog converters 187 and 189. The output of the converter 187 supplies a signal which is indicative of the COS of the accumulated angle $\theta_{(n)}$ in register 185 to multipliers 175 and 181. The converter 189 supplies a signal to multiplier 177 which is indicative of the negative SIN of this accumulated phase angle, while it supplies a positive SIN indication to multiplier 179. The outputs of multipliers 175 and 179 are summed in a full adder 191 and supplied to lead 90 as $X_{(n)}$ while the outputs of multipliers 177 and 181 are added together in full adder 193 to produce an output on lead 92 as $y_{(n)}$.

FIGS. 11 and 12

FIG. 11 provides more detail as to the basic demodulator and illustrates the use of an automatic gain control circuit 200 for receiving the input signals from lead 52, normalizing them to unity main pulse value, and supplying them through an analog to digital converter 202 and a sign hold circuit 204 to multiplying circuits 44 and 42. The multipliers 42 and 44 receive their inputs from a local reference phase generator 206 whose output is changed from phase to amplitude by converters 208 and 210 before being supplied as COS of the angle and negative SIN of the angle to multipliers 44 and 42, respectively, as shown. The outputs of the multipliers are supplied through low-pass filters 46 and 48 to the outputs of 58 and 56. The low-pass filter may be designed utilizing the same principles as illustrated in FIG. 6 of my copending application Ser. No. 36,742 filed May 13, 1970 and entitled "Digital Demodulating Apparatus." However, details of one block 46 have been included in a rudimentary fashion.

Referring to both FIG. 12 and FIG. 11 it will be noted that a complete transmission symbol on line 52 occurs over a 12 ADC sample period as illustrated by the pulses $f_s$. Each of the ADC sample pulses $f_s$ occurs once every 64 clock pulses in one embodiment of the invention. It will be further noted that the ADC samples which are utilized in the invention occur only during the middle eight sample periods of a 12 sample transmission symbol. The signal being sampled by the ADC is illustrated in FIG. 23. Thus, The input control $M_1$ is utilized to help actuate an AND circuit 212 in combination with periodically occurring input $R_1$. The output of AND gate 212 is supplied to an inverter 214 and to an AND gate 216. The output of inverter 214 is supplied to one input of an AND gate 218 which receives another input from the output of a 16 bit shift register 220 whose output is also connected to terminal 58. Terminal 58 is also connected to one input of an AND gate 22 which receives another input $R_2$. The output of AND gate 222 is supplied as one input to a full adder 224 which receives its other input from the input of the low pass filter 46. The output of full adder 224 is supplied as a second input to AND gate 216 whose output is supplied to an OR gate 226. OR gate 226 receives a second input from AND gate 218 and supplies an output to the 16 bit shift register 220.

In operation the low-pass filter 46 periodically receives the input $M_1$ and on each occurrence of input $R_1$ the AND gate 218 is deactivated while the AND gate 216 is activated to allow the output of shift register 220 to traverse through AND gate 222 and be added to a sampled component incoming signal from multiplier 42 in the full adder 224 and then be returned to the shift register. Between $R_1$ pulses the signal in the 16 bit shift register is recirculated through the AND gate 218 and the OR gate 226. As will be noted $R_2$ is normally positive and normally permits the output of shift register 220 to be supplied to full adder 224. However, except for the occurrences of $R_1$, the AND gate 216 is not activated. Thus, during an $R_1$ pulse the 16 bit shift register contents are recirculated in a long path including the full adder 224 and then are circulated through the short pass path including AND gate 218 three times before being recirculated again through the full adder. It will be further noticed that once each incoming data transmission symbol. The $R_2$ signal goes negative to prevent the output of shift register 220 from being returned to full adder 224. This clears the shift register to accept a new series of eight transmission symbol samples which are accumulated to provide the output Y. The various pulses $M_2$ through $M_{10}$ are also illustrated in FIG. 12 to give an idea of the relative occurrence with respect to the transmission symbol in later explanations. The later explanations will have an expanded view of symbols $M_2$ through $M_{10}$ and reference may be required to FIG. 12 for a better understanding of the waveform timing.

FIGS. 13 and 14

It should be realized that many multipliers are illustrated in this application and operate with digital signals. An example of a digital multiplier which may operate to provide the necessary multiplication is illustrated in my copending application entitled "Digitalized Multiplier" filed Feb. 25, 1970, now issued as U.S. Pat. No. 3,617,723 on Nov. 2, 1971 and assigned to the same assignee as the present invention. Although the sign hold feature illustrated in FIG. 13 and other figures is old to those skilled in the art, the above referenced multiplier application also discloses a sign hold circuit in more detail which may be used in the present invention.

It will be further noticed that FIG. 13 is a compilation in part of previous figures in an attempt to gradually build the system as shown in FIG. 1. In other words, a rotating circuit is shown as previously described in FIG. 10 while a multiplying circuit for prepulse equalization is shown as previously described in FIG. 9.

Reference may be first had to the prepulse equalizer sections labeled 62′ for the X and Y components. It will be noted that normally the eight bit digital data symbol signal is circulated around each of the data symbol storage loops due to the occurrence of the $\overline{M}_3$ signal being applied to an AND gate such as 235 through OR gate 237 and an eight bit shift register 239. Once each data symbol, an $M_3$ pulse occurs to activate an AND gate such as 241 and thus deactivate the AND gate 235 and thereby permit entry of a new data symbol representation into the shift register such as 239 and further transfer the previously stored signal to the following storage unit or storage loop.

In FIG. 13 it will be noted that there are several AND gates which are not connected to receive inputs. Again, these AND gates are shown at the present only for completeness and the utilization of such AND gates will be apparent from further reading of the specification. At time $M_2$, AND gates 243, 245, and 247 will be activated to allow the estimated values of the in and quad phase components, of the next signal to be received, to be supplied to the multiplying circuits 158–164 as previously describe in conjunction with FIG. 9. These signals to be multiplied are supplied to registers of the multipliers during time $M_2$ so that during time $M_3$ the AND gates 249 and 251 allow the application of the signals received on lines 56 and 58 to be supplied to the multipliers which are then added in the full adders 154′ and 156′. The outputs of these adders are then further added to the $X_n$ and $Y_n$ signals received from the first storage stages through sign hold circuits 253 and 255. As will be realized, the description so far is entirely contained in the description of FIG. 9 relating to prepulse equalization. The output of the full adders 154″ and 156″ are then supplied through AND gates 257 and 259 at time $M_4$ to the rotation circuit such as shown and labeled in FIG. 10. The prepulse equalized signal is immediately multiplied in the multipliers since the signal indicative of phase angle was previously supplied to the multipliers for storage therein at time $M_6$. At time $M_5$ the storage units 94 and 96 are reset to receive the new data symbol digital indication. This is accomplished in storage unit 94 by supplying a $\overline{M}_5$ signal to an AND circuit 261 and a $M_5$ signal to 263. The output of these two AND circuits are supplied through an OR gate 265 to an eight bit shift register 267. Thus, the data symbol signal will normally rotate for 760 ADC clock pulses, out of the 768 ADC clock pulse transmission symbol cycle, in the storage unit 94 and then during the eight clock pulse period of $M_5$ will be eliminated since it cannot rotate again through the AND circuit 261 but rather will receive a new input from full adder 191 through the AND circuit 263. The new data symbol indication will then rotate for the next 760 clock pulses. As will be noted, the $M_6$ pulse occurs twice each transmission data symbol since the rotating circuit is used for more than just the prepulse equalization rotation. During the positive time period of $M_9$, the full adders 98 and 100 receive the signal $\Delta X_{(n)}$ and $\Delta Y_{(n)}$ to be negatively added to the signals received from the storage units 94 and 96 and are thereby adjusted in amplitude before being supplied during the same $M_9$ pulse to the phase measurement circuit 106.

FIGS. 15 and 16

Each of the averaging circuits 124 and 126, as shown in FIG. 1, are of the same configuration. Therefore, only one averaging circuit is being shown in detail. The averaging circuit operates to add each presently received signal, rotated by a given phase, which rotated phase is governed by the relationship of the angle of the present phase to the angle of a data symbol occurring a given number of data symbols previously, to a plurality of previously received and rotated symbols. As shown, only eight data symbols are illustrated since the present embodiment is usable with the special eight symbol preamble to be discussed later.

At time $R_t$, an AND gate 270 is activated so that an incoming indication of the received signal is supplied through an OR circuit 272 to the 64 bit shift register 274. The occurrence of the signal $R_t$ acts through an OR gate 276 and an inverting circuit 278 to deactivate the AND gate 280 and prevent the normal circulation of the symbols contained in 64 bit shift register 274. Instead, the symbols are required to go through an additional eight bit shift register 282 before being returned to the shift register 274 in the time period immediately following the $R_i$ pulse. A $C_i$ pulse is also supplied through OR gate 276 to keep AND gate 280 deactivated during the entire time indicated as $ACC_t$. As is shown in waveform $P_4$ of FIG. 16, the presently received signal and the last received signal are added in a full adder 284 immediately upon receipt of the new signal. A sign hold circuit 286 is utilized to stretch the signal into a 16-bit word. During the next 16-bit time period the signals which were designated in shift register 274 as signal representations $\alpha_2$ and $\alpha_3$ are added in the full adder 284 and applied through the sign hold 286. Each of these added signals are supplied through a full adder 288 to a first shift register 290 and from there through an AND gate 292 and an OR gate 294 to an eight-bit shift register 296 and hence to a further shift register 298. The $ACC_t$ signal applied to AND gate 292 allows the transmission of the signal presently being added two at a time through the entire shift registers 296 and 298. The $\overline{ACC_t}$ signal (which is the inverse or negative function of $ACC_t$) prevents the minor circulation path through AND gate 300 and a further AND gate 302 is prevented from circulating the signal at the start of this process by a signal $I_t$. This signal is normally activated to allow rotation of the stored signal for all but 16 of the 768 clock pulse periods.

In other words, the $I_t$ signal clears the 16-bit shift register (290, 296, and 298) while the $R_t$ signal operates to clear the 64 bit shift register 274 of the oldest eight bits of data. During the time when $ACC_t$ is not positive, the words in shift register 274 circulate around the minor loop through AND gate 280. At the time of occurrence of $R_t$, the word corresponding to $\alpha_8$ is in shift register 282. Upon the occurrence of $R_t$ the inverting action of inverter 278 deactivates AND gate 280 so that the oldest data symbol word $\alpha_8$ is prevented from being supplied through AND gate 280 to shift register 274. During this same time the new word $\alpha_0$ is transferred through AND gate 270 and OR gate 272 to the first storage space in shift register 274. This new word $\alpha_0$ takes the position behind the word $\alpha_8$ which had been previously rotated around the minor loop through AND gate 280 and which would have been entered twice if allowed to circulate through the major loop and the AND gate 306. After $\alpha_0$ is entered in shift register 274, $R_t$ ceases and $C_t$ produces circulation around the major loop until the old $\alpha_8$ word is in shift register 282. At this time $C_t$ changes so that it is no longer positive, thereby reactivating the minor loop. At this time the $\alpha_8$ word in shift register 282 is clocked out and eliminated leaving eight words $\alpha_0$ $\alpha_1$ to $\alpha_7$ in shift register 274.

By the above operation, a new word is entered into the averaging circuit each data symbol period and the oldest data symbol word is eliminated.

FIGS. 17 and 18

FIG. 17 illustrates the use of two pairs of phase rotating circuits for doing all the rotation of the input signals of FIG. 1. In other words, the left-hand dash line block containing a rotator combines the functions of 60 and 102 in FIG. 1 while the center dash line block combines the functions of 68, 74, and 118 in FIG. 1. The multiple use of a single multiplying or phase rotating circuit is obtained by time sharing.

As will be ascertained, the $X_{n+1}$ and $X_n$ input signals are supplied through a plurality of AND gates and OR gates to a pair of multiplying circuits. The $X_n$ signal is allowed to be supplied thereto at time $M_7$ while the $X_{n+1}$ is supplied at time $M_3$. The same conditions are true for the $Y_{(n)}$ and $Y_{(n+1)}$ inputs. As will be further noted, the $\theta_n$ and $\beta_t$ inputs are supplied at times $M_6$ and $M_8$, respectively. As previously indicated $M_6$ occurs at two different times so that $\theta$ may be used for the two negative phase rotations as explained in conjunction with FIG. 13. Further, the $M_8$ input occurs as three time intervals for inserting three different $\beta_t$'s to perform three positive rotations of incoming $X_n$ and $Y_n$ values. Referring to FIG. 18 it will be noted that first the $\beta_t$ value is supplied in conjunction with $M_8$ which is the gating pulse and then the $M_7$ gating pulse is supplied to allow $X_n$ and $Y_n$ and the SIN $\beta_t$ and COS $\beta_t$ from Φ/A blocks 189 and 187 to be input to multipliers 158, 160, 162, and 164. Each multiplication occurs separately and produces the plurality of positively rotated inputs to the averaging circuits represented as a block labeled 124 and 126. This block is additionally labeled 62 since it also performs the prepulse equalization function as shown in FIG. 1 and supplies outputs along with the averaging block to the negative rotation block 68. In actuality the outputs may all be connected to each of the appropriate input AND circuits in 118, 74, and 68 with the gating circuitry providing the distribution of the signals at the proper time period.

In FIG. 17 the $\theta_n$ signal on lead 114 is brought in through an AND gate 315 in conjunction with the timing pulse $M_6$. The $\beta_t$ input is brought in through an AND gate 317 in conjunction with the timing pulse $M_8$. These two AND gates are connected through an OR gate 319 to the two previously referenced phase to amplitude converters 187 and 189. The output of 187 is supplied through an AND gate 321 in connection with the timing pulse $M_7$ to an input of an OR gate 323 which also receives an output from AND gate 243. OR gate 323 supplies an output to the multiplying circuits 158 and 164 as well as supplying an input to a further AND gate 325 which operates in conjunction with a timing pulse $M_7$ to supply inputs to the multiplying circuits 175 and 193. The phase amplitude converter 189 supplies signals of negative SIN and positive SIN through AND gates 327 and 329, respectively, each in conjunction with an $M_7$ timing pulse to a pair of OR gates 331 and 333, respectively. The output of OR gate 333 is connected to supply an input to multiplier 160 as well as to AND gate 335 which supplies its $M_7$ gated output through an OR gate 337 to the input of a further multiplying circuit 179 in the negative phase rotation unit 68, 74, and 118. The OR gate 331, which supplies the −SIN $\beta_i$ signal, supplies an input to the multiplier circuit 162 and operates through a $M_7$ controlled AND gate 339 and an OR gate 341 to supply an input to a multiplier 177 in the negative rotation unit.

The output of the negative rotation unit has previously been shown as supplying inputs to the prepulse estimating averaging circuits 76 and 78 and to the storage units 94 and 96. The output of the negative rotator is now shown supplied to the ΔX and ΔY accumulators 128 and 130. The accumulators are very similar to previously described units such as the storage units 94 and 96 of FIG. 13.

The unit 128 will be described in slightly more detail. Normally, the data bits in the eight-bit shift register 343 circulate from output back through an AND gate 345 and an OR gate 347 to the input. This is accomplished by the inversion of the CA signal in an inverter 349 whereby a second input ($\overline{CA}$) is supplied to the AND gate 345. However, after each phase rotation of the averaged word from the averaging circuits 124 and 126, in the block 118, a CA pulse occurs to activate an AND gate 351 while the $\overline{CA}$ input deactivates the AND gate 345. A $\overline{RR1}$ signal clears the shift register 343 by deactivating an AND gate 353 for the period of time when the unit 128 is receiving a first phase rotated average signal $\hat{X}_i$ from averaging circuit 124 and the rotate phase negative circuit 118. On the next two receptions of an average value $\hat{X}_2$ and $\hat{X}_3$, the signal is rotated through AND gate 353 and added with the incoming signal in a full adder 355 before being returned to the eight bit shift register through AND gate 351 and OR gate 347. As may be noted in block 118 a plurality of AND gates 357, 359, and 361, respectively, gate through the $\hat{I}_1$, $\hat{I}_2$, $\hat{I}_3$ signals in response to the gating signals RRI, RR2, and RR3. Since as may be ascertained from FIG. 18 these three gating signals occur at different times, the multiplication will occur without interference and be supplied at separate times to the accumulating circuit 128. The same multiplication occurs for the $\hat{Q}$ inputs and are supplied in the same manner to the Y accumulating circuit 130. Since an $X_{(n-2)}$ or $Y_{(n-2)}$ input has not been previously disclosed, AND gates 363 and 365 are numbered to illustrate that these inputs are supplied to the negative rotation circuit during the time of the $M_9$ pulse. It may be thus ascertained that the negative rotation circuit is first used to provide the negative rotation function of block 68. This is accomplished with gating pulse $M_4$. Then, the three rotations necessary in block 118 are performed for the three averaged values. This negative rotation is of course accomplished coincident with the positive rotation in the block 102 and the averaging blocks 124 and 126. The prepulse rotation is then accomplished during time period $M_9$ and the output is supplied to the blocks 76 and 78. Blocks 76 and 78 of course supply their outputs to the positive phase rotator circuit 60 as inputs $L_1$ and $Q_{-1}$ for positive rotation during the next transmission symbol as the first rotation sequence during time period $M_2$.

FIGS. 19, 20, and 21

As previously indicated, FIG. 19 is representative of the contents of block 110 in FIG. 1. In operation the circuitry of FIG. 19 is much like other storage means previously described wherein a $\overline{M}_{10}$ signal normally circulates data bits from an eight-bit shift register 370 through an AND gate 372 and an OR gate 374. The signal is prevented from being supplied through a full adder 376 and a further AND gate 378 by the lack of an $M_{10}$ signal. Upon the occurrence of an $M_{10}$ signal the AND gate 372 is deactivated and the output of the eight-bit shift register 370 is full added in circuit 376 which has an input 108 and then supplied to the eight-bit shift register 370 to be circulated for the next 760 time clocks until a further accumulated phase angle from the phase measurement circuit 106 is received.

As may be ascertained in FIG. 21, the $M_{10}$ pulse occurs immediately after the $M_9$ pulse so that the output on lead 114, until the occurrence of the $M_{10}$ pulse and in fact up to the end of the time of the $M_{10}$ pulse, is the previous accumulated angle. However, after the $M_{10}$ pulse occurs, the output on lead 114 is the new accumulated phase angle. This new accumulated phase angle will be continuously repeated at 114 until the same $M_{10}$ pulse occurs during the next data transmission symbol.

In FIG. 20 a pair of accumulators are utilized to provide the $\beta_i$ signal. As before, $\overline{M}_{10}$ signals normally allow circulation of the contents of the eight-bit shift registers while, at the time occurrence of pulse $M_{10}$, the signal within eight-bit shift register 380 is prevented from being circulated but is rather transmitted through an AND gate 382 and an OR gate 384 to a second eight-bit shift register 386. Upon losing the previous phase signal in shift register 380, a new phase signal is supplied through an AND gate 388 and an OR gate 390.

In supplying the correct phase angles to blocks 102 and 118, the $\beta_i$ angle is the signal being received prior to the occurrence of $M_{10}$. Since the angle of the vector formed by the X and Y components is the same as the angle of the signal which was contributing the first distortion product, no output occurs from the lead 116 until $RR_1$. $\beta_1$ therefore equals zero. It can be seen from FIG. 18 that the first time $M_8$ is positive no input is present on line 116. However, during time period $RR_1$ an AND gate 392 is activated by pulse $RR_1$ and supplied through an OR gate 394 to provide an output $\beta_2$ to the rotate circuit 102 and 118. This output, $\beta_2$, occurs during the second interval in which $M_8$ and $RR_1$ are positive. The correction angle $\beta_2$ then equals $\Delta\Phi_{(n-1)}$ as required by Equation 27 infra. The $\beta_3$ signal is the difference between the present signal to be rotated and the phase angle of the pulse occurring three time periods ago or $\Delta\Phi_{(n-1)}+\Delta\Phi_{(n-2)}$ as required by Equation 28 infra. This is obtained by full adding the output of shift registers 380 and 386 in a full adder 396 and supplying this to an AND gate 398 to be outputted through OR gate 394 at time period $RR_2$ which occurs coincident with the third positive $M_8$ interval as shown in FIG. 18.

FIGS. 22–25

While it was indicated previously that the modulator of FIGS. 1 and 4 could be implemented using the information contained in my copending Multiple Tone Generator application, a more detailed implementation of a single tone unit is shown in FIG. 22 for completeness of this disclosure.

Digital data is supplied to a coding device 400 for transmission to two full adders 402 and 404. The output of coder 400 is a phase increment which may use either of the codings shown in FIG. 25. The output of full adder 402 is supplied through an AND gate 406 and an OR gate to a full adder 407. The full adder 407 also receives a tone generating input 408 and has an output which is supplied to an eight-bit shift register 410. The input 408 causes an incremental change in phase of a circulating word to produce the waveform shown in FIG. 23. The shift register 410 has a plurality of parallel outputs which are connected to a read only memory 412. It also has a serial output which is connected back to full adder 402 and to full adder 404 as well as to one input of an AND gate 414. For gating purposes a $C_1$ input is supplied to gate 406 while a $\overline{C}_1$ is supplied to gate 414. An even/odd generator 416 is connected to supply a plurality of gating signals to the read only memory (ROM) 412 at a rate $f_s$ so that it may supply a parallel output to a parallel full adder 418. The full adder 418 supplies a parallel output to a digital to analog converter 420 which is clocked by an input $f_s$ and whose output is supplied through a low pass filter 422 to the transmission facility 52. As may be ascertained the portion of FIG. 22 described thus far will provide usable output information. However, the data can be more efficiently transmitted when the data symbols overlap. Since the apparatus described can't handle overlapping data symbols, a further, substantially identical unit is used in the lower half of FIG. 22. As may be observed from FIGS. 23 and 24, the data symbols, labeled odd and even, do overlap and thus more efficient use may be made of the transmission facility 52. Thus, the output of coder 400 is also supplied to an AND gate 424 whose output is supplied through an OR gate to an eight-bit shift register 426. The output of shift register 426 is supplied to AND gate 428 and through an OR gate back to the eight-bit shift register 426. The output of shift register 426 is also supplied to a further input to of full adder 402. A $C_2$ input is supplied for gating AND gate 424 while a $\overline{C}_2$ input is supplied to gate 428 for normally producing circulation of the phase information in shift register 426 around the minor loop comprising AND gate 428 and its connected OR gate. The output of full adder 404 is supplied through an AND gate 430 and an OR gate to a full adder 432. Full adder 432 is clocked by a K input 434 which may be the same as the word appearing on line 408. An output of full adder 432 is supplied to an eight-bit shift register 436 having a parallel output to a ROM 438 and a serial output to an AND gate 440. Gate 430 is gated by a $C_2$ signal while 440 is gated by a $\overline{C}_2$ signal. ROM 438 receives a parallel input from each of generator 416 and register 436 and provides a parallel output to full adder 418.

In operation data is supplied to coder 400 and depending upon whether four-phase and eight-phase coding is utilized, either two or three consecutive serial data bits produce a phase change according to the coding scheme of FIG. 25. The change in phase is labeled $\Delta\Phi_{n+1}$. This signal produces an abrupt change in the phase of the digital word circulating in a minor loop including AND gate 414 of shift register 410 upon the next occurrence of a $C_1$ pulse. At the same time, the phase of this word is updated by the phase previously supplied to the even or lower modulator portion. This is accomplished by storing each even change of phase word in a circulating loop including shift register 426. It will be noted that the previous phase change word is eliminated and a new word stored on each consecutive $C_2$ pulse. As indicated above, the 408 input acts to change the phase of the word in shift register 410 at a much higher rate than the phase which is obtained from coder 400. In FIG. 24 a waveform labeled W is illustrated showing the occurrence of 24 time periods per $C_1$ or $C_2$ pulse. These 24 time period sequences also occur only once for each odd or even data symbol. In accordance with the W clocking sequence, the ROM 412 samples the word in shift register 410 24 times per sequence or every other transmission symbol (4 data bits) and adjusts the amplitude of this word in accordance with a prescribed algorithm which will produce an output waveform such as shown as $S_0$ in either FIG. 23 or FIG. 24.

The next phase alteration is supplied to the lower or even portion of the modulator to update the phase of the signal supplied to shift register 436. This is accomplished by adding to the present phase the phase change obtained from coder 400. While there are several ways to obtain the present phase, one way is to obtain the present phase information from shift register 410. This information is thus added in full added 404 and supplied at the time of occurrence of clock pulse $C_2$. This action eliminates the previous phase information instead of updating the information as was accomplished in the upper or odd portion of the modulator. Since the phase updating is accomplished when the ROM's 412 and 438 restrict the output to zero amplitude, there is no problem with abrupt phase changes at the output 52. However, it will be noted that during time periods 3–8 and 15–20 of the weighting function W there is a summation of the outputs of both ROM's 412 and 438 in the parallel full adder 418. As will be realized, the converter 420 changes the parallel digital input words to analog output signals at a carrier frequency $f_s$. This output, which changes in amplitude, is filtered in filter 422 to provide the output signal to be transmitted in the facility.

GENERAL RESPONSE MEASUREMENT DISCUSSION

The demodulator output signal $X_{(n)}$ and $Y_{(n)}$ as shown in FIG. 4 is used along with estimates of the data over the past N pulses to measure the facility in phase and quad phase response. A demodulator with phase update operation such as is used in my previously referenced copending applications is assumed in the following discussion. This type of demodulator has a carrier reference phase $\theta$ which is set equal to the received carrier phase of the previous transmission symbol each sample interval as shown in FIG. 4. This carrier reference is then used to measure the phase difference with respect to the next received pulse or data symbol and the phase $\theta$ of the carrier reference. Thus, the present demodulator reference phase $\theta_n$ is set equal to an estimate of the previous signal phase $\Phi_{(n-1)}$. This estimate of the previous signal phase is labeled $\hat{\Phi}_{(n-1)}$ and is approximately equal to the modulator phase angle $\Phi_{(n-1)}$. The demodulator output during sample interval $n$ from a pulse transmitted $i$ intervals earlier can be written $$X_{i(n)} = I_i \cos[\Phi_{(n-1)} - \hat{\Phi}_{(n-1)}] - Q_i \sin[\Phi_{(n-i)} - \hat{\Phi}_{(n-1)}] \quad (8)$$

$$Y_{i(n)} = Q_i \cos[\Phi_{(n-i)} - \hat{\Phi}_{(n-1)}] + I_i \sin[\Phi_{(n-i)} - \hat{\Phi}_{(n-1)}] \quad (9)$$

These demodulator outputs of Equations 8 and 9 can be considered to be the two components of a dimensional vector obtained by measuring the input signal against the carrier reference set 47 and 47 of FIG. 4. This can be considered to be a complex number and may thus be combined to form a two dimensional vector as shown in Equation 10.

$$Z_{i(n)} = X_{i(n)} + jY_{i(n)} = [I_i + jQ_i]\, e^{\{j(\Phi(n-i) - \hat{\Phi}(n-1)\}}$$

$$Z_{i(n)} = S_i\, e^{\{j(\Phi(n-i) - \hat{\Phi}(n-1)\}} \quad (10)$$

The demodulator output at sample interval $n$ can then be written as follows where the intersymbol interferences are assumed to extend over $N_a$ pulses after the main pulse and $N_b$ pulses before the main pulse.

$$X_{(n)} = \sum_{i=N_b}^{N_a} X_{i(n)} \quad (11)$$

$$Y_{(n)} = \sum_{i=N_b}^{N_a} Y_{i(n)} \quad (12)$$

$$Z_{(n)} = X_{(n)} + jY_{(n)} = \sum_{i=N_b}^{N_a} Z_{i(n)}$$

$$= \sum_{i=N_b}^{N_a} \{X_{i(n)} + jY_{i(n)}\} = \sum_{i=N_b}^{N_a} S_i\, e^{\{j(\Phi(n-i) - \hat{\Phi}(n-1))\}}$$

$$= \sum_{i=N_b}^{N_a} S_i\, e^{\{-i\beta_i\}} \quad (13)$$

The $i = 0$ pulse represents the main pulse present at time $n$, the $i = 1$ represents the previous pulse, and $i = N_a$ the furthest removed previous pulse from the present pulse. Thus, $i = -1$ represents the next pulse after the $n$ pulse.

Generally, the channel measurement or facility response measurement can be described as an operation which measures the projection of the distortion products $S_i$ on the main pulse $S_0$ utilized as a reference. The phase update demodulation technique measures the phase of the receive pulse (main pulse) against the phase $\theta$ of a locally generated reference which has been adjusted to equal the phase of the previously received pulse.

First to be considered will be the distortion caused by the pulse $S_{0(n)}$ during sample interval $n + 1$. The demodulator reference $R_{(n+1)}$ phase $\theta$ has been adjusted to agree with the main pulse $S_{0(n)}$ phase and the signal structure $S_{0(n+1)}$ and the first post pulse interference $S_{1(n)}$ arriving during sample interval $n + 1$ are then demodulated relative to $S_{0(n)}$ or $R_{(n+1)}$. The projection of the first distortion product $S_{1(n)}$ on the main pulse $S_{0(n)}$ or $R_{(n+1)}$ is then obtained. The distortion product is obtained as in phase $I_{1(n)}$ and quadrature phase $Q_{1(n)}$ components of $S_{1(n)}$ relative to $S_{0(n)}$ at the demodulator output and is independent of the received signal phase. This is illustrated in FIG. 7.

Next to be considered is the distortion $S_{2(n)}$ caused by the main pulse $S_{0(n)}$ which arrives during sample interval $n + 2$. The demodulator output during interval $n + 2$ is referenced to the pulse $R_{(n+2)}$ or $S_{0(n+1)}$. This reference has been phase shifted by an amount equal to $\Delta\Phi_{n+1)}$ which equals the received signal phase $\Phi_{(n+1)}$ at time $n$+1 minus the phase at time $n$ or $\Phi_{(n)}$. This is the amount of phase shift used to phase update the local carrier demodulator reference. This value would be as shown in FIG. 7 and would be the same as $\beta_2$ in FIG. 20. The distortion product $S_{2(n)}$ has been obtained using $R_{(n+2)}$ or equivalently $S_{0(n+1)}$ as a reference. In effect the basis axis or reference for measuring $S_{2(n)}$ has been rotated by the angle $\Delta\Phi_{(n+1)}$ and the $S_{2(n)}$ measurement can be corrected relative to the $S_{0(n)}$ pulse as reference by rotating measurement $S_{2(n)}$ by the same $\Delta\Phi_{(n+)}$ angle. The rotational algorithm is shown by equation (16).

In the same manner the distortion $S_{3(n)}$ caused by $S_{0(n)}$ during sample interval $n + 3$ is measured relative to $R_{(n+3)}$ or $S_{0(n+2)}$ as a reference. This can be corrected to a $S_{0(n)}$ reference by rotating the measurement by the angle $\Delta\Phi_{(n+1)} + \Delta\Phi_{(n+2)}$ which is the amount the demodulator carries reference has been rotated since time interval $n$.

The discussion up to this point has been concerned with measuring the distortion products which occur after or subsequent to the main pulse $S_{0(n)}$ at sample interval $n$. Transmission facilities, which do not have symmetrical differential delay distortion about the modulator center frequency, produce some distortion products $S_{-1(n)}$ prior to the main pulse $S_{0(n)}$. An output $S_{-1(n)}$ occurring at sample interval $n - 1$ is measured relative to the reference $R_{(n-1)}$ or $S_{0(n-2)}$. This output can be referenced to $S_{0(n)}$ by rotating $S_{-1(n)}$ by angle $[-\Delta\Phi_{(n)} - \Delta\Phi_{(n-1)}]$ as shown in FIG. 7.

All distortion products can then be obtained by use of a rotation algorithm. The angles for rotation are those measured for the demodulator phase update operation. In order to obtain a specific distortion product say $S_{1(n)}$ independent of the other contributors $S_{-1}$, $S_0$, $S_2$, etc., a type of averaging will be utilized.

As previously indicated in the specification, two averaging methods can be used in making the facility distortion measurement. The first technique requires random data into the modulator and uses long term averaging in the equalizer. The second technique uses a selected eight-frame preamble into the modulator and eight-frame integration at the equalizer. In either the first or second technique the following equalizer rotation algorithm will be used to modify the demodulator output.

The modulator transmits an angle $\Phi_{(n)} = \Phi_{(n-1)}$ plus the coded increment $\Delta\Phi_{(n)}$. The phase update type demodulator measures $\Delta\Phi_{(n)}$ each sample interval and adjusts the local reference by $\Delta\Phi_{(n)}$ to the value $\Phi_{(n)}$ for the $n + 1$ sample interval. The phase increment $\Delta\Phi_{(n)}$ is then obtained each sample interval. The phase increment is $$\Delta\Phi_{(n)} = \Phi_{(n)} - \Phi_{(n-1)} \quad (14)$$

The angles appearing in Equations 8–13 can be obtained in terms of $\Delta\Phi$ which are measured variables as follows:

$$\beta_{i(n)}=\Phi_{(n-1)}-\Phi_{(n-i)}=\sum_{j=1}^{i=1}\Delta\Phi(n-j)\,i>1$$
$$=0\,i=1$$
$$=\sum_{j=0}^{-i}\Delta\Phi(n+j)\,i<1 \qquad (15)$$

The angle $\Delta_i$ is the sum of the previous $i$–1 measured phase update angles and is the same angle that was used in the previous discussion to rotate the demodulator output. This rotation in effect corrected the phase error that occurs when $S_{i(n)}$ is measured relative to $R_{(n)}$ and not to $S_{0(n)}$. To measure $S_k$ the demodulator output $Z_{(n)}$ must be rotated by the angle $\beta_k$ and averaged. The averaging will act as an orthogonal demultiplex of the various $S_i$ components as will be described later. Equations 13 and 15 may be rewritten to illustrate the computational algorithm required to measure the distortion product $S_k$.

$$S_k=I_k+jQ_k=\text{ave}\,[Z_{(n)}e^{\{j\beta_{k(n)}\}}] \qquad (16)$$

$$\hat{S}_k=\text{ave}\left[\sum_{i=N_b}^{N_a}S_i e^{\{j(\beta_k-\beta_i)\}}\right]$$

$$\hat{I}_k=\sum_{i=N_b}^{N_a}\text{ave}\,[I_i\cos(\beta_k-\beta_i)-Q_i\,\text{SIN}\,(\beta_k-\beta_i)] \qquad (17)$$

$$\hat{I}_k=\text{ave}\,[X_{(n)}\cos\beta_k-Y_{(n)}\text{SIN}\beta_k]$$

$$\hat{Q}_k=\sum_{i=N_b}^{N_a}\text{ave}\,[Q_i\,\text{COS}\,(\beta_k-\beta_i)+I_i\,\text{SIN}\,(\beta_k-\beta_i)] \qquad (18)$$

$$\hat{Q}_k=\text{ave}\,[Y_{(n)}\text{COS}\beta_k+X_{(n)}\text{SIN}\beta_k]$$

Where $Z_{(n)}=X_{(n)}+jY_{(n)}$ = unequalized demodulator output at sample interval $n$ $\beta_k$ =

$$\sum_{j=1}^{k-1}\Delta\Phi_{(n-j)}$$

= sum of $k$–1 previous phase update measurements at sample interval $n$ $I_k$ = in phase intersymbol interference from pulse $k$ sample intervals earlier.

$Q_k$ = quadrature phase intersymbol interference from pulse $k$ sample intervals earlier.

ave [ ] = an averaging operation described next.

The first equalizer measurement implementation technique requires random data into the modulator and utilizes long-term integration of the equalizer signal as indicated in Equation 16. This implementation is based upon the assumption or probability that the angles $\beta_k-\beta_i$ are equally distributed for all angles whether $k-i$ is an even or an odd integer. In other words, the angle obtained by Equation 19, as follows, may be any one of four equally probable angles for $k-i$ being an even or odd integer for the case of four phase DC-PSK modulation.

$$\beta_k-\beta_i=\Phi_{(n-i)}-\Phi_{(n-k)} \qquad (19)$$

If equation 16 is rewritten to include the sample index $n$ the following Equations 20 and 21 may be obtained.

$$\hat{S}_{k(n)}=\hat{I}_{k(n)}+j\hat{Q}_{k(n)} \qquad (20)$$

$$\hat{S}_{k(n)}=\text{ave}\,[Z_{(n)}e^{\{-j\beta_{k(n)}\}}] \qquad (21)$$

The averaging may be accomplished with a sampled data one pole low-pass filter to obtain an estimate of $S_{k(n)}$ as indicated in Equation 22.

$$S_{k(n)}=T\sum_{m=0}^{n}h_{(m-n)}Z_{(m)}e^{\{j\beta_{k(m)}\}}=\text{ave}\,[Z_{(n)}e^{j\beta_{k(n)}}] \qquad (22)$$

where $$h_{(l)}=e^{-clT} \qquad (\text{note: } l=m-n)$$

The equalizer computation from the above equations results in the following:

$$\begin{array}{lll}\text{av}[\cos(\beta_k-\beta_i)]=1 & \text{if} & i=k\\ \quad =0 & \text{if} & i\neq k\\ \text{ave}[\sin(\beta_k-\beta_i)]=0 & \text{for all } i & \end{array} \qquad (23)$$

The above Equations 23 basically indicate that over a long term average the only output obtained will be that where the COS of the angle being averaged is 0 or in other words where the reference angle is the same as the phase angle of the pulse whose distortion component is being measured.

The equalizer output $\hat{S}_k$, can be written as follows by substituting Equation 23 into Equations 17 and 18.

$$\hat{I}_k=I_k=\text{ave}\,[\text{Real}(Z_{(n)}e^{\{j\beta_k\}})] \qquad (24)$$

$$\hat{Q}_k=Q_k=\text{ave}\,[\text{Imaginary}(Z_{(n)}e^{\{j\beta_k\}})] \qquad (25)$$

The equalizer algorithm required to measure one pre and three post intersymbol interference contributions can then be written as follows where ave [ ] is defined by Equation (22).

$$\hat{I}_1<\text{ave}\,[X_{(n)}] \qquad (26)$$
$$\hat{Q}_1=\text{ave}\,[Y_{(n)}]$$

$$\hat{I}_2=\text{ave}\,[X_{(n)}\cos(\Delta\Phi_{(n-1)})-Y_{(n)}\sin(\Delta\Phi_{(n-1)})] \qquad (27)$$
$$\hat{Q}_2=\text{ave}\,[Y_{(n)}\cos(\Delta\Phi_{(n-1)})+X_{(n)}\sin(\Delta\Phi_{(n-1)})]$$

$$\hat{I}_3=\text{ave}\,[X_{(n)}\cos(\Delta\Phi_{(n-1)}+\Delta\Phi_{(n-2)})-Y_{(n)}\sin(\Delta\Phi_{(n-1)}+\Delta\Phi_{(n-2)})] \qquad (28)$$

$$\hat{Q}_3=\text{ave}\,[Y_{(n)}\cos(\Delta\Phi_{(n-1)}+\Delta\Phi_{(n-2)})+X_{(n)}\sin(\Delta\Phi_{(n-1)}+\Delta\Phi_{(n-2)})]$$

$$\hat{I}_{-1}=\text{av}\,[X_{(n)}\cos(-\Delta\Phi_{(n)}-\Delta\Phi_{(n+1)})-Y_{(n)}\sin(-\Delta\Phi_{(n)}-\Delta\Phi_{(n+1)})] \qquad (29)$$

$$\hat{Q}_{-1} = \text{ave}\,[Y_{(n)}\cos(-\Delta\Phi_{(n)}-\Delta\Phi_{(n+1)}) + Y_{(n)}\sin(-\Delta\Phi_{(n)}-\Delta\Phi_{(n+1)})]$$

The computation for prepulse distortion (Equation 29) requires phase measurements $\Delta\Phi_{(n)}$ and $\Delta\Phi_{(n+1)}$ before they are available inasmuch as sample time $n$ is concerned. This problem can be resolved by delaying the modulation output by two samples ($n = m - 2$) whereby the computation then becomes:

$$\hat{I}_{-1} = \text{ave}\,[X_{(m-2)}\cos(\Delta\Phi_{(m-1)}+\Delta\Phi_{(m-2)}) + Y_{(m-2)}\sin(\Delta\Phi_{(m-1)}+\Delta<\tfrac{2}{3}\Phi_{(m-2)})] \quad (30)$$

$$\hat{Q}_{-1} = \text{ave}\,[Y_{(m-2)}\cos(\Delta\Phi_{(m-1)}+\Delta\Phi_{(m-2)}) - Y_{(m-2)}\sin(\Delta\Phi_{(m-1)}+\Delta<\tfrac{2}{3}\Phi_{(m-2)})]$$

The delay by two samples or data transmission symbols is illustrated in FIGS. 8 and 9 we well as in FIG. 13.

The second equalizer measurement implementation, which is shown in detail in the drawings and described in detail in the specification, requires a particular preamble message into the modulator. The preamble is selected such that the conditions of the equally distributed phase increments in Equations 19 and 23 are obtained. The average operation will be defined as that of accumulation over a fixed number of samples $N_s$ equal to the preamble interval. The preamble message phase shift restrictions are used to make the various measured components, $\hat{S}_k$, orthogonal to one another over the accumulation interval. These phase restrictions can be determined by investigating the angle ($\beta_k - \beta_i$) for each desired measurement. These angles are illustrated for the single pre and three post pulse interference case and for four phase DC-PSK coding. As may be ascertained from examining the contents of Table 1 presented below, in any eight consecutive data symbol period the phase angles of the main pulse average out to zero, but so do the averages of the first, second, third, and fourth previously transmitted pulses with respect to the main pulse. Thus, it may be ascertained that if the reference is constantly shifted, or if the demodulated product is constantly shifted in accordance with the phase of the pulse contributing the distortion product which is to be measured, $\beta_i$, then all components attributable to other data symbols will cancel out over any given eight data symbol period. The various distortion products can then be orthogonally demultiplexed by first rotating the demodulator output $Z_{(n)}$ by the angle $\beta_{k(n)}$ and accumulating, ave [ ], over any eight consecutive data symbols.

TABLE 1

| $n$ | $\Delta\Phi(n)$ | $\Delta\Phi(n)+$ $\Delta\Phi(n-1)$ | $\Delta\Phi(n)+$ $\Delta\Phi(n-1)+$ $\Delta\Phi(n-2)$ | $\Delta\Phi(n)+$ $\Delta\Phi(n-1)+$ $\Delta\Phi(n-2)+$ $\Delta\Phi(n-3)$ |
|---|---|---|---|---|
| 6 | −135 | 0 | −45 | 180 |
| 7 | 45 | −90 | 45 | 0 |
| 8 | 135 | 180 | 45 | 180 |
| 9 | 31 45 | 90 | 135 | 0 |
| 10 | 45 | 0 | 135 | 180 |
| 11 | −135 | −90 | −135 | 0 |
| 12 | −45 | 180 | −135 | 180 |
| 13 | 135 | 90 | −45 | 0 |
| 14 | −135 | 0 | −45 | 180 |
| 15 | 45 | −90 | 45 | 0 |
| 16 | 135 | 180 | 45 | 180 |
| 17 | −45 | 90 | 135 | 0 |
| 18 | 45 | 0 | 135 | 180 |

TABLE 1

Another way of saying the above is that the measurement for $\hat{S}_1$ is orthogonal to $\hat{S}_{-1}$, $\hat{S}_0$, $\hat{S}_2$, and $\hat{S}_3$ if the allowable phase increments $\Delta\Phi_{(n)}$ and $\Delta\Phi_{(n)} + \Delta\Phi_{(n-1)}$ are equally distributed over the accumulation interval of $N_s$ samples. Likewise the $\hat{S}_2$ measurement is orthogonal to the remaining referenced distortion or main pulse contributors if the allowable phase increments $\Delta\Phi_{(n)}$, $\Delta\Phi_{(n)}+\Delta\Phi_{(n-1)}$, and $\Delta\Phi_{(n)}+\Delta\Phi_{(n-1)}+\Delta\Phi_{(n-2)}$ are equally distributed over the accumulation interval. Equation 21 can be rewritten as follows:

$$\hat{S}_{k(n)} = \sum_{m=n-N_s}^{n} [Z_{(m)}e^{\{j\beta_{k(m)}\}}] \quad (31)$$

(Where the accumulation interval $N_s$ can be any integer multiple of eight samples.)

In summary, each of the four signals can be measured without interference from any of the others by selecting a preamble message such that the angles $\Delta\Phi_{(n)}$, $\Delta\Phi_{(n)}+\Delta\Phi_{(n-1)}$, $\Delta\Phi_{(n)}+\Delta\Phi_{(n-1)}+\Delta\Phi_{(n-2)}$ and $\Delta\Phi_{(n)}+\Delta\Phi_{(n-1)}\alpha\Delta\Phi_{(n-2)}+\Delta\Phi_{(n-3)}$ are equally distributed over the accumulation interval as shown in Table 1.

The computation algorithm Equations 26–31 can then be used to measure the distortion products $\hat{S}_1$, $\hat{S}_2$, $\hat{S}_3$, and $\hat{S}_{-1}$, respectively.

DISTORTION CORRECTION

The above section on Response Measurement as applied to FIG. 1 outlines the theory preparatory to producing the outputs from blocks 124, 126, 76, and 78. The present section expands slightly on obtaining these values and provides more information on the use and combination of these values with the demodulated signal.

The facility intersymbol distortion can be cancelled once the measurements of the distortion products ($\hat{S}_1$, $\hat{S}_2$, $\hat{S}_3$, etc.) and phases ($\beta_1$, $\beta_2$, $\beta_3$, etc.) are available. This can be shown from Equation 13 which is repeated as Equation 32 for convenience.

$$Z_{(n)} = \sum_{i=N_b}^{N_a} S_i e^{\{-j\beta_i\}} \quad (32)$$

The distortion products occurring after the main pulse may be considered first and can be presented with Equation 32 rewritten as Equation 33.

$$Z_{a(n)} = \sum_{i=1}^{N_a} S_i e^{\{-j\beta_i\}} \quad (33)$$

The estimates of $S_i$ or $S_i$ and of $\beta_i$ are used to obtain an estimate of $Z_{a(n)}$ the postpulse distortion, as illustrated in Equations 34–36

$$\hat{Z}_{a(n)} = \sum_{i=1}^{N_a} \hat{S}_i e^{\{-j\beta_i\}} \quad (34)$$

$$\hat{Z}_{a(n)} = \sum_{i=1}^{N_a} [\hat{I}+j\hat{Q}_i][\cos(\beta_i) - j\sin(\beta_i)]$$

$$\hat{X}_{a(n)} = \sum_{i=1}^{N_a} [\hat{I}_i\cos\beta_i + \hat{Q}_i\sin\beta_i] = \Delta X_{(n)} \quad (35)$$

$$\hat{Y}_{a(n)}=\sum_{i=1}^{N_a}[\hat{Q}_i\cos\beta_i-\hat{I}_i\sin\beta_i]=\Delta Y_{(n)} \quad (36)$$

Since the example being discussed uses three post interference pulses ($N_a = 3$) the following equations present the correction algorithm for the $\Delta X_{(n)}$ and $\Delta Y_{(n)}$ components.

$$\Delta X_{(n)}=\hat{I}_1+ \quad (37)$$
$$\hat{I}_2\cos[\Delta\Phi_{(n-1)}]+\hat{Q}_2\sin[\Delta\Phi_{(n-1)}]+$$
$$\hat{I}_3\cos[\Delta\Phi_{(n-1)}+\Delta\Phi_{(n-2)}]+\hat{Q}_3\sin[\Delta\Phi_{(n-1)}+\Delta\Phi_{(n-2)}]$$
$$\Delta Y_{(n)}=\hat{Q}_1+ \quad (38)$$
$$\hat{Q}_2\cos[\Delta\Phi_{(n-1)}]-\hat{I}_2\sin[\Delta\Phi_{(n-1)}]+$$
$$\hat{Q}_3\cos[\Delta\Phi_{(n-1)}+\Delta\Phi_{(n-2)}]-\hat{I}_3\sin[\Delta\Phi_{(n-1)}+\Delta\Phi_{(n-2)}]$$

The correction signal $\hat{Z}_{a(n)}$ is subtracted from the demodulator output $Z_{(n)}$ in full adders 98 and 100 of FIG. 1 and the result $Z'_{(n)}$ can be written as Equation 39.

$$Z'_{(n)}=Z_{(n)}-\hat{Z}_{a(n)} \quad (39)$$

$$Z'_{(n)}=\sum_{i=N_b}^{0}S_i e^{[-j\beta_i]}+Z_{a(n)}-\hat{Z}_{(n)}$$

The echo or tail cancellation technique described above for the three postpulse distortion components ($1 \leq i \leq N_a$) cannot be used to cancel the prepulse interference ($N_b \leq i \leq -1$). It may be assumed for the following discussion and for the implementation shown in FIG. 1 that only one prepulse product is significant and need be cancelled. A two tap (one delay) time transversal equalizer as shown in FIGS. 8 and 9 along with an estimate of the prepulse interference ($\hat{S}_{-1} = \hat{I}_{-1} + j\hat{Q}_{-1}$) may be used to cancel $S_{-1}$. The magnitude of the main pulse $|S_0|$ is measured and supplied to the circuit as shown in FIG. 8. Alternatively as previously indicated an AGC may be used to adjust the magnitude of the main pulse $|S_0|$ to unity. The transversal equalizer output $z_{0(m)}$ can then be written in terms of the input $z_{(m)}$ and the prepulse distortion estimate $S_{-1}$ as follows in Equation 40.

$$z_{0(m)}=z_{(m-1)}-z_{(m)}\hat{S}_{-}l \quad (40)$$
$$z_{0(m)}=x_{0(m)}+jy_{0(m)}$$
$$x_{0(m)}=x_{(m-1)}-x_{(m)}\hat{I}_{-1}+y_{(m)}\hat{Q}_{-}l$$
$$y_{0(m)}=y_{(m-1)}-x_{(m)}\hat{Q}_{-1}-y_{(m)}\hat{I}_{-1}$$

As previously explained the transversal equalizer implementation to obtain the $x$ and $y$ components of the $Z$ product of Equation 40 is presented in FIG. 9. The technique will cancel the product $S_{-1}$ but produces a new presymbol distortion product $S_{-2}$ two symbols before the main pulse $S_0$. However, this new presymbol distortion product is magnitude squared and is of such a small value compared to the main pulse that it can be disregarded. The following equalizer inputs, Equation 41, and outputs, Equation 42, are obtained from the implementation as shown in FIG. 9 and illustrate the prepulse cancellation technique.

$$\text{Input, } z_{(m)} \quad (41)$$
$$z_{(n-2)}=0$$
$$z_{(n-1)}=S_{-1}$$
$$z_{(n)}=S_0$$
$$z_{(n+1)}=0$$
$$\text{Output, } z_{0(m)}=z_{(m-1)}-z_{(m)}\hat{S}_{-}l \quad (42)$$
$$z_{0(n-2)}=0$$
$$z_{0(n-1)}=0-(S_{-1})(\hat{S}_{-1}) \doteq -(S_{-1})^2$$
$$z_{0(n)}=S_{-1}-(S_0 \doteq 1.0)(\hat{S}_{-1}) \doteq 0$$
$$z_{0(n+1)}=S_0-0(\hat{S}_{-1})=S_0$$
$$z_{0(n+2)}=0$$

The presymbol interference product $S_{-1}$ is cancelled and the new product $S_{-2} = S_{-1}^2$ is formed. The magnitude of $S_{-2}$ is reduced considerably from that of $S_{-1}$ being squared $(S_{-1})^2$ and normalized to less than unity by the $|S_0| \doteq 1.0$ operation. The two tap prepulse equalizer may be inserted as shown in FIG. 1 before the postpulse equalizer. FIG. 1 is modified from the above equations in that the phase update operation has been removed from the local reference phase generator and inserted after the prepulse equalizer in a separate operation. This reference phase generator is block 110. The acceptability of separating the basic demodulator operation from the phase update operation can be shown as follows in Equation 43 which combines the values of Equations 5 and 7.

$$Z_{(n)}=[I+jQ]e^{[j(\overline{\Phi_{(n)}}-\theta)]} \quad (43)$$
$$Z_{(n)}=([I+jQ]e^{[j\Phi_{(n)}]})e^{[-j\theta]}$$
$$Z_{(n)}=(x_{0(n)}+jy_{0(n)})e^{[-j\theta]}$$

In Equation 43 the part of $Z_{(n)}$ enclosed in parentheses is the demodulator output without phase updating and the last term is the phase update operation. The demodulator output $z_{(n)}$ will be processed by the prepulse equalizer and this equalizer output $z_{0(n)}$ will be rotated by $\theta$ or equivalently the phase updated angle $\Phi_{(n)}$. The rotation operation can be written as in Equations 44–46.

$$Z_{(n)}=X_{(n)}+jY_{(n)}=z_{0(n)}e^{[-j\theta_{(n)}]} \quad (44)$$

Then $$X_{(n)}=x_{0(n)}\cos[_{(n)}]+y_{0(n)}\sin[_{(n)}] \quad (45)$$
$$y_{(n)}=y_{0(n)}\cos[_{(n)}]-x_{0(n)}\sin[_{(n)}] \quad (46)$$

Where $$\theta_{(n)}=\sum_{i=1}^{\infty}\Delta\Phi_{(n-i)}=\hat{\Phi}_{(n-1)} \quad (47)$$

The operation of the rotate phase minus, block 68, then accomplishes the phase update action.

Figure 3:
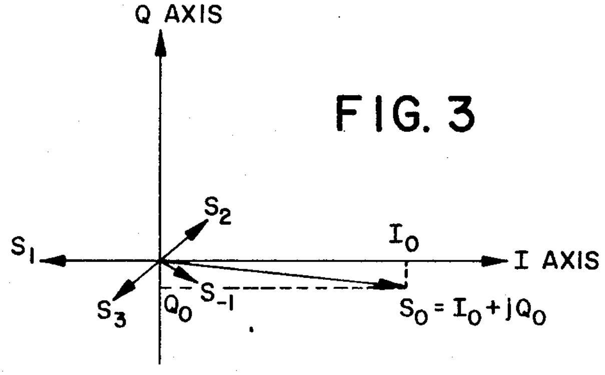

The rotation operation implementation is shown in various figures such as FIGS. 3 and 17. The phase angle $\theta_{(n)}$ is obtained by accumulating all of the previous phase measurements $\Delta\Phi_{(n)}$, Equation 47. The measurement of the prepulse distortion product $\hat{S}_{-1}$ requires $z_{(m-2)}$ to be provided without the equalization. This can be deduced since the product $S_{-1}$ would cancel after the equalization and hence leave no signal product $S_{-1}$ to measure. The prepulse equalizer is tapped after the eight-bit shift register 239 in block 62' of FIG. 13 and after register 150 in FIG. 9 before equalization to obtain the $x_{0(m-1)}$ and $y_{0(m-2)}$ data symbols delayed two samples from the main pulses $z_{0(n)}$ and $Z_{(n)}$. These delayed values will be used along with the phase angle $\theta_{(n)}$ to compute the prepulse algorithm. Equations 48–50 provide the mathematical formulation of $S_{-1}$ and its component values.

$$\hat{S}_{-1} = \text{ave}\left[z_{(m)}\, e^{\{-j\Phi(m+1)\}}\right] \quad (48)$$

re-index on $m = n-2$ $$\hat{S}_{-1} = \text{ave}\left[z_{(n-2)}\, e^{\{-j\Phi(n-1)\}}\right]$$

$$\hat{I}_{-1} = \text{ave}\left[x_{(n-2)}\cos[\Phi_{(n-1)}] + y_{(n-2)}\sin[\Phi_{(n-1)}]\right] \quad (49)$$

$$\hat{Q}_{-1} = \text{ave}\left[y_{(n-2)}\cos[\Phi_{(n-1)}] - x_{(-2)}\sin[\Phi_{(n-1)}]\right] \quad (50)$$

The proof that Equations 49 and 50 or equivalently Equation 48 can be used to measure $\hat{S}_{-1}$ is shown as follows:

$$\hat{S}_{-1} = \text{ave}\left[\sum_{i=N_b}^{N_a} S_1 e^{\{j\Phi(n-2-i)\}} e^{\{-j\Phi(n-1)\}}\right] \quad (51)$$

$$\hat{S}_{-1} = \text{ave}\left[S_{-1)}\right] \qquad i = -1$$

$$= 0 \qquad i \neq -1$$

The other contributions are orthogonal because of the balanced phase states of $\Phi_{n-2)}$ over $n$ data symbol time periods as described previously.

FIG. 1 is one possible implementation of an equalizer utilizing the above pre and post pulse algorithms.

SUMMARIZATION

From the above it may be ascertained that the present invention is a new autoequalizer implementation for substantially reducing the distortion components in a given data symbol contributed by neighboring data symbols in a data stream being transmitted over a transmission facility. The implementation shown is specifically directed to an eight-bit preamble facility response measurement technique but can readily be expanded to utilize completely random data symbols if the averagers or integrators are expanded in duration from eight accumulations for the preamble mode.

Further, the apparatus of FIG. 1 can be modified to provide equalization using both techniques. In other words the apparatus can initially equalize on the preamble and then use the continually received random data for maintaining equalization.

The apparatus of FIG. 1 provides the measurement of the distortion products by rotating the demodulated product vector by an amount which is indicative of the phase of the data symbol which is producing the distortion component of interest and of which the attempt is proceeding to measure. The present signal consists of distortion product components from many time intervals. Since random data for all other components will have equally occurring phase differences with respect to all other particular data symbols, over a selected preamble period all other contributing data symbols will average to zero leaving only the distortion component under consideration.

The presently received distortion components may then be recreated vectorally and combined with the demodulator product which is then used to measure the phase difference between the previously received and present data symbol which is the important data contributing information in DC-PSK.

While a single embodiment of the present invention has been illustrated and described it is to be realized that other implementations than that shown can be designed from the algorithms presented.

I therefore wish to be limited not by the implementation shown but only by the scope of the appended claims wherein, I claim:

1. The method of measuring the distortion components of a signal introduced by a transmission facility after modulation of the signal, wherein the signal comprises a series of phase shifted data symbols, comprising the steps of:

modulating a transmitted carrier in a sequence of phase shifts representing a series of data bits, the sequence having a repetition period, wherein comparison of phase shifts of the signal, for each symbol in the sequence, with each of the other data phase shifts contributing distortion products of interest, produces an average comparison of zero;

demodulating the received carrier to provide a first signal comprising a main component of a given data symbol and further distortion components supplied by other data symbols;

separately adjusting said first signal in accordance with a characteristic of each of the data phase shifts of interest contributing distortion products to produce a plurality of second signals; and separately averaging each of said plurality of second signals over said sequence to obtain a plurality of third signals each indicative of the distortion component contributed by a given date symbol to said first signal as a result of the transmission facility.

2. The method of claim 1 comprising the additional step of removing from said first signal the distortion components as indicated by said third signal to provide an "equalized" fourth signal.

3. The method of measuring the distortion components in a transmitted DC-PSK data symbol which distortion components were contributed in a transmission facility by neighboring data symbols comprising the steps of:

demodulating a received DC-PSK signal to produce a composite vector first signal ($Z_n$) including $I$ (real) and $Q$ (quadrature) components of a main given and neighboring contributory data symbols;

rotating said first signal according to the equation $$S_k = Z_{(n)} e^{i\beta_k}$$

where $S_k$ =the distortion component contributed by a data symbol $k$ symbols removed from the first signal data symbol occurring at sample period $n$, $\beta_k$ =the phase increment between the data symbol occurring at $n$ as transmitted and the data symbol as transmitted at time $n-k$ which is contributing the component $S_k$, $ej\beta k$ is indicative of the polar coordinate rotational angle for each of the data symbols contributing distortion components to said signal $Z_n$; and separately averaging said $S_k$ products for each component to obtain a plurality of distortion component vector values $\hat{S}_k$.

4. The method of claim 3 comprising the additional step of removing from said $Z_n$ signal the distortion components $\hat{S}_k$ to provide an "equalized" signal $Z'_n$.

5. Apparatus for measuring distortion components in a DC-PSK signal contributed in a transmission facility by data symbols neighboring a data symbol being demodulated comprising, in combination:

first means for receiving a DC-PSK signal to be demodulated;

demodulating means for demodulating DC-PSK signals connected to said first means for receiving a signal therefrom and supplying an output second signal indicative of a series of phase shifted data symbols, a particular data symbol indication including distortion contributions of time neighboring data symbols;

first signal rotation means, including input, output, and control means for rotating a data symbol indication between input and output means thereof in response to a control signal supplied to said control means thereof;

second signal rotation means, connected to said output means of said first signal rotation means, for separately, positively rotating the signal appearing at said output means of said first signal rotation means by an amount equal to the phase increment between the phase of the data symbol presently being received and the phase of each of the data symbols of interest contributing distortion components to the data symbol indication at said output means of said first signal rotation means;

first averaging means, connected to said second signal rotation means, for separately averaging the outputs of said second rotation means for each distortion contributing component of interest to provide a plurality of averaged values;

third rotation means, connected to said averaging means, for negatively rotating each of the averaged values received from said averaging means by the angle of said positive respective rotation;

first combining means connected to said third and first rotation means for adjusting the data symbol indication received from said first rotation means by a composite value obtained from said third rotation means to obtain an output third signal indicative of the phase increment of the presently received data symbol with respect to the previously received data symbol; and second means connecting said combining means to said control means of said first rotation means for supplying the control signal to control the rotation angle thereof.

6. Apparatus as claimed in claim 5 wherein said second means comprises an angle accumulator and wherein said apparatus comprises in addition:

phase increment storage means connected to said combining means and said second and third rotation means for supplying phase increment information indicative of the rotational angle between the measured and distortion contributing data symbols to said second and third rotational means.

7. Apparatus as claimed in claim 5 wherein presymbol contribution to the data symbol being measured is minimized in said demodulating means wherein said demodulating means comprises, in combination:

delay means for delaying the signal received from said first means by a times equal to one and three data symbols at first and second outputs thereof, respectively;

negative fourth signal rotation means connected to said second output of said delay means and said control means of said first rotation means for negatively rotating the data symbol received from said delay means by an amount indicative of the received rotational control signal;

second averaging means, connected to said fourth rotation means for averaging the outputs thereof to provide an output indicative of prepulse distortion;

positive fifth rotation means for rotating the signal received from said first means by an angle indicative of the output signal from said second averaging means to produce a signal indicative of prepulse distortion; and second combining means for combining said signal received from said first output of said delay means with the signal obtained from said fifth rotation means for minimizing prepulse distortion in said output second signals supplied by said demodulating means.

8. The method of measuring the distortion in received differentially coherent phase shift keyed data symbols comprising the steps of:

transmitting a series of data symbols phase modulated according to the sequence of +45°, −135°, −45°, +135°, −135° +45°, +135° and −45°;

receiving and demodulating said modulated data symbols;

rotating separately the demodulated presently received data symbols to an angle commensurate with the angle of each of a plurality of neighboring data symbols; and averaging each of the rotated data symbols in sets of specific data symbol rotations over at least one 8-data symbol sequence for measuring the phase distortion components contributed by each of said plurality of neighboring data symbols.

9. Apparatus for measuring the distortion components of a signal introduced by a transmission facility after modulation of the signal, wherein the signal comprises a series of data symbols of a given length, comprising, in combination:

means for modulating a transmitted carrier in a prescribed sequence representing the series of data bits, the sequence having a repetition period, wherein comparison of bit representing symbols of the signal, for each symbol in the repetition period, with each of the other data bit symbols contributing distortion products of interest, produces an average comparison of zero;

means for demodulating the carrier to provide a first signal comprising a main component of a given data bit symbol and further distortion components supplied by other data bit symbols;

means for separately adjusting said first signal, in accordance with a characteristic of each of the data bit symbols of interest contributing distortion products, to produce a plurality of second signals;

and means for separately averaging each of said plurality of said second signals over said repetition period to obtain a plurality of third signals each indicative of the distortion component contributed by a given data bit symbol to said first signal as a result of a transmission facility.

10. The apparatus of claim 9 comprising in addition means for removing from said first signal the distortion components as indicated by said third signal to provide an equalized fourth signal.

11. Apparatus as claimed in claim 10 wherein the modulation is phase modulation of the differentially coherent-phase shift keyed type and wherein the adjusted characteristic is phase rotation.

12. Apparatus as claimed in claim 10 wherein said means for modulation includes means for phase modulation according to the sequence of +45°, −135°, −45°, +135°135°, +45°, +135° and −45°; and said means for separately adjusting comprises means for rotating the phase of said first signal to the phase angle of the data bit symbols as originally demodulated by the apparatus.

13. The method of measuring the phase distortion components of a signal introduced by a transmission facility after modulation of the signal, wherein the signal comprises a series of data symbols, comprising the steps of:

phase modulating a carrier over a prescribed period of time for transmission over a facility wherein the modulation represents a series of data symbols;

demodulating the carrier to provide a first signal comprising a main component of a given data signal and further distortion components supplied by neighboring data symbols in the series;

separately adjusting said first signal in accordance with the phase of each of the data symbols of interest contributing distortion components to produce a plurality of second signals; and separately averaging each of said plurality of second signals over a predetermined time period to obtain a plurality of third signals each indicative of the phase distortion component contributed by a given data symbol to said first signal as a result of the transmission facility.

14. The method of claim 13 comprising the additional step of removing from said first signal the distortion components as indicated by said third signals to provide an "equalized" fourth signal.

* * * * *